(12) United States Patent
Koyanaka

(10) Patent No.: US 8,465,701 B2
(45) Date of Patent: Jun. 18, 2013

(54) CATALYST MATERIAL FOR PRODUCING OXYGEN GAS FROM WATER

(75) Inventor: Hideki Koyanaka, Kyoto (JP)

(73) Assignee: Kyoto University, Kyoto (JP)

( * ) Notice: Subject to any disclaimer, the term of this patent is extended or adjusted under 35 U.S.C. 154(b) by 700 days.

(21) Appl. No.: 12/450,430

(22) PCT Filed: Mar. 25, 2008

(86) PCT No.: PCT/JP2008/055598
§ 371 (c)(1),
(2), (4) Date: Mar. 31, 2010

(87) PCT Pub. No.: WO2008/123256
PCT Pub. Date: Oct. 16, 2008

(65) Prior Publication Data
US 2010/0196746 A1    Aug. 5, 2010

(30) Foreign Application Priority Data

| Mar. 27, 2007 | (JP) | 2007-083098 |
| Apr. 12, 2007 | (JP) | 2007-104588 |
| Oct. 10, 2007 | (JP) | 2007-264018 |
| Jan. 29, 2008 | (JP) | 2008-018340 |

(51) Int. Cl.
*B01J 23/34* (2006.01)
*C01B 13/02* (2006.01)
*C01B 31/24* (2006.01)
*C01G 45/02* (2006.01)
*C07C 53/08* (2006.01)
*C07H 1/00* (2006.01)
*G01N 27/00* (2006.01)
*H01M 10/44* (2006.01)
*C07C 45/00* (2006.01)

(52) U.S. Cl.
USPC ............ 422/98; 210/702; 210/710; 210/722; 423/419.1; 423/579; 423/605; 423/658.2; 429/50; 502/324; 532/1; 536/124; 562/607; 568/449

(58) Field of Classification Search
USPC .... 423/605, 657, 579, 419.1, 658.2; 428/402; 562/607; 536/124; 502/324; 532/1; 422/98; 429/50; 568/449; 210/702, 710, 722
See application file for complete search history.

(56) References Cited

U.S. PATENT DOCUMENTS

| 2,165,428 A * | 7/1939 | Waugh .......................... 502/241 |
| 6,517,802 B1 * | 2/2003 | Xiao et al. ................. 423/592.1 |

(Continued)

FOREIGN PATENT DOCUMENTS

| JP | 2005-263615 | 9/2005 |
| JP | 2007-90342 | 4/2007 |
| JP | 2007-238424 | 9/2007 |

OTHER PUBLICATIONS

International Search Report issued Jul. 8, 2008 in International (PCT) Application No. PCT/JP2008/055598.

(Continued)

*Primary Examiner* — Wayne Langel
(74) *Attorney, Agent, or Firm* — Wenderoth, Lind & Ponack, L.L.P.

(57) ABSTRACT

Provided is a catalyst material comprising aggregates of nanoneedles of mainly R-type manganese dioxide and having a mesoporous structure. With this, water can be oxidatively decomposed under visible light at room temperature to produce oxygen gas, proton and electron. Also provided is a catalyst material comprising aggregates of nanoparticles of mainly hydrogenated manganese dioxide. With this, acetic acid or an inorganic substance can be synthesized from carbon dioxide gas.

27 Claims, 31 Drawing Sheets

U.S. PATENT DOCUMENTS

| | | | |
|---|---|---|---|
| 7,655,148 B2* | 2/2010 | Chen et al. | 210/688 |
| 2002/0074174 A1* | 6/2002 | Dettling et al. | 180/68.1 |
| 2004/0138061 A1* | 7/2004 | Allen et al. | 502/324 |
| 2006/0018821 A1* | 1/2006 | Suzuki et al. | 423/605 |
| 2008/0121584 A1* | 5/2008 | Chen et al. | 210/496 |

OTHER PUBLICATIONS

Koyanaka et al., "Synthetic Route of Nano-Ramadellite Through A Protonated Manganese Oxide", 2006 Nen (Heisei 18 Nen) Shuki Dai 67 Kai Extended abstracts; the Japan Society of Applied Physics, separate vol. 1, Aug. 29, 2006, p. 213.

Naruta, Y. et al., "Oxygen Evolution by Oxidation of Water with Manganese Porphyrin Dimers", Angew. Chem. Int. Ed. Engl., vol. 33, No. 18, 1994, pp. 1839-1841.

Ruttinger, W. et al., "Synthetic Water-Oxidation Catalysts for Artificial Photosynthetic Water Oxidation", Chemical Reviews, vol. 97, No. 1, 1997, pp. 1-24.

Shimazaki, Y. et al., "Characterization of a Dinuclear $Mn^V=O$ Complex and Its Efficient Evolution of $O_2$ in the Presence of Water", Angew. Chem. Int. Ed., vol. 43, 2004, pp. 98-100.

* cited by examiner

TIC Chromatogram and Mass Chromatogram of Glucose (trimethylsilylated: TMS)

Aqueous 10 % Glucose Solution 5 μl + TMSI-C (TMS reagent) 0.5 ml

Mass Spectrum of Trimethylsilicated Glucose

TIC Chromatogram and Mass Chromatogram of Sample (trimethylsilylated-2)

Sample 4 mg + Pyridine 0.4 ml:BSTFA (TMS reagent) 0.05 ml

TIC Chromatogram and Mass Chromatogram of Sample (trimethylsilylated: TMS)

Aqueous 10 % sulfuric acid solution was dropwise added to sample 5 mg-$H_2O$ 0.5 ml (aqueous 10 % solution).

50 μl of the aqueous solution was dried, 0.2 ml of TMSI-C was added for trimethylsilylation (TMS)

(a)

(b)

CATALYST MATERIAL FOR PRODUCING OXYGEN GAS FROM WATER

TECHNICAL FIELD

The invention of this application relates to a catalyst material that functions with visible light for producing oxygen gas from water and to a method for producing oxygen gas using the catalyst material, to a catalyst material for producing acetic acid or an organic substance from carbon dioxide gas and to a method for producing acetic acid or an organic substance by decomposing carbon dioxide gas by the use of the catalyst material, to a method for generating electric energy, to a hydrogen gas sensor, to a method for producing acetic acid and a saccharide, to a method for recycling a waste (method for producing a catalyst material and R-type manganese dioxide from an aqueous divalent manganese solution), to a method for producing R-type manganese dioxide, etc.

BACKGROUND ART

Utilizing the energy of visible light having a wavelength of from 400 to 500 nm in sunlight, plants produce oxygen gas and organic substances from water and carbon dioxide. The photosynthetic reaction in plants is multi-stage reaction, in which oxidative decomposition of water is a reaction positioned in the starting point. On the other hand, decomposition of carbon dioxide and conversion into organic substances are the final-stage reaction of photosynthetic reaction.

A latest report has clarified that, for the oxidative decomposition of water in plants, a cluster composed of four manganese atoms and one calcium atom existing in the membrane of a chloroplast acts as a catalyst that oxidatively decomposes water with utilizing sunlight energy (B. Loll, et al., Nature, 438, 1040 (2005)).

However, the cell (Photo System II) that contains the above-mentioned cluster in the chloroplast of a plant contains only four manganese atoms that bring about a catalytic effect of oxidatively decomposing water, and therefore in future, it is extremely difficult to artificially synthesize a large quantity of oxygen gas through industrial oxidative decomposition of water by utilizing the reaction of oxidative decomposition of water by plants. Heretofore, as an example of oxidative decomposition of water by an artificial catalyst substance, there is mentioned an example with a titania catalyst or a dye sensitizing catalyst. However, oxidative decomposition of water with a titania catalyst requires previous irradiation with UV rays having an energy level of from about 3.0 to 3.2 eV. The necessary energy for oxidative decomposition of water with a dye sensitizing catalyst is about 3.0 eV and is lower than that with the titania catalyst, but the dye sensitizing catalyst is a chemically unstable material and its practical use is not as yet realized. Accordingly, a catalyst material is not found as yet, which can efficiently attain oxidative decomposition of water with visible light having an energy level of from 2.0 to 2.5 eV like in actual photosynthesis by plants. In addition, it is also extremely difficult to decompose a large quantity of carbon dioxide on an industrial scale to convert it into organic substances, by utilizing the reaction of a plant that decomposes carbon dioxide in air to synthesize organic substances.

As in the above, there is known no example of efficiently generating oxygen gas through oxidative decomposition of water only with sunlight energy like in plants according to already-existing artificial catalyst technology, and in fact, neither material nor method has been found out that exhibits an excellent catalytic capability for decomposing carbon dioxide to convert it into organic substances.

DISCLOSURE OF THE INVENTION

Under the above-mentioned background, objects of the present invention are to provide a catalyst material capable of oxidatively decomposing water under visible light at room temperature to generate oxygen gas, a method for producing the catalyst material, a method for producing oxygen gas and a method for generating electric energy, using the catalyst material, a hydrogen gas sensor, a catalyst material capable of reducing carbon dioxide gas at room temperature into acetic acid or an organic substance, a method for producing the catalyst material, and a method for decomposing carbon dioxide gas to produce acetic acid and an organic substance using the catalyst material, and a method for synthesizing acetic acid and a saccharide.

Further, other objects of the invention are to provide a method for recycling the waste to be formed in the process of producing the above-mentioned catalyst material, and a novel production method for synthesizing R-type manganese dioxide from an aqueous divalent manganese solution.

To solve the above-mentioned problems, the invention provides the following:

<1> A catalyst material for producing oxygen gas, proton and electron by oxidatively decomposing water, which comprises aggregates of nanoneedles of mainly R-type manganese dioxide and has a mesoporous structure.

<2> The catalyst material of the above <1>, wherein the mesoporous structure has a mean pore diameter falling within a range of from 3 nm to 30 nm, a BET specific surface area of from 40 to 200 $m^2/g$, and a total pore volume falling within a range of from 0.1 to 0.5 $cm^3/g$.

<3> The catalyst material of the above <1> or <2> wherein the manganese dioxide nanoneedles have a diameter falling within a range of from 1 nm to 50 nm and a length falling within a range of from 3 nm to 500 nm.

<4> The catalyst material of any of the above <1> to <3> wherein the manganese dioxide aggregates have a diameter falling within a range of from 1 to 100 μm.

<5> A catalyst material for producing acetic acid or an organic substance from carbon dioxide gas, which comprises aggregates of nanoparticles of mainly hydrogenated manganese dioxide.

<6> The catalyst material of the above <5>, wherein the aggregates of nanoparticles of hydrogenated manganese dioxide are aggregates of nanoneedles of hydrogenated manganese dioxide and have a mesoporous structure.

<7> The catalyst material of the above <6> wherein the mesoporous structure has a mean pore diameter falling within a range of from 3 nm to 30 nm, a BET specific surface area of from 40 to 200 $m^2/g$, and a total pore volume falling within a range of from 0.1 to 0.5 $cm^3/g$.

<8> The catalyst material of the above <6> or <7>, wherein the hydrogenated manganese dioxide nanoneedles have a diameter falling within a range of from 1 nm to 50 nm and a length falling within a range of from 3 nm to 500 nm.

<9> The catalyst material of any of the above <6> to <8>, wherein the aggregates of the hydrogenated manganese dioxide nanoneedles have a diameter falling within a range of from 1 to 100 p.m.

<10> A method for producing a catalyst material for producing oxygen gas, proton and electron by oxidatively decomposing water, which comprises burning a divalent manganese compound, then acid-treating it and thereafter drying it.

<11> The method for producing a catalyst material of the above <10>, wherein the divalent manganese compound is manganese carbonate.

<12> The method for producing a catalyst material of the above <10>, wherein the compound is, after dried, further washed with water or with hot water.

<13> A method for producing a catalyst material for producing acetic acid or an organic substance from carbon dioxide gas, which comprises burning a divalent manganese compound, and then acid-treating it.

<14> The method for producing a catalyst material of the above <13>, wherein the divalent manganese compound is, after burned and acid-treated, further washed with water.

<15> The method for producing a catalyst material of the above <13>, wherein the divalent manganese compound is, after burned and acid-treated, further dried and then acid-treated.

<16> The method for producing a catalyst material of the above <15>, wherein the compound is, after dried and before acid-treated, washed with water or with hot water.

<17> The method for producing a catalyst of any of the above <13> to <16>, wherein the divalent manganese compound is manganese carbonate.

<18> A method for recycling the acid-treatment liquid (waste liquid) after the acid treatment of the burnt divalent manganese compound in the method for producing a catalyst material of the above <10> to <17>, which comprises adding an oxidizing agent and an alkali compound to the acid-treatment liquid after the acid treatment to thereby precipitate manganese oxide, then acid-treating the manganese oxide precipitate, and drying it to give R-type manganese dioxide.

<19> A method for recycling the acid-treatment liquid (waste liquid) after the acid treatment of the burnt divalent manganese compound in the method for producing a catalyst material of the above <10> to <17>, which comprises adding potassium permanganate to the acid-treatment liquid after the acid treatment to give manganese dioxide.

<20> A method for recycling the acid-treatment liquid (waste liquid) after the acid treatment of the burnt divalent manganese compound in the method for producing a catalyst material of the above <10> to <17>, which comprises adding an alkali metal or alkaline earth metal carbonate to the acid-treatment liquid after the acid treatment to give manganese carbonate.

<21> A method for producing oxygen gas from water by using a catalyst material of any of the above <1> to <4>, wherein the catalyst material is contacted with an aqueous acid solution under visible light to produce oxygen gas.

<22> A method for synthesizing acetic acid or an organic substance by decomposing carbon dioxide gas by the use of a catalyst material of any of the above <5> to <9>, wherein carbon dioxide gas is contacted with the catalyst material in the presence of an aqueous acid solution.

<23> A method for generating electric energy by using a catalyst material of any of the above <1> to <4> wherein the catalyst material is contacted with an aqueous acid solution under visible light.

<24> A hydrogen gas sensor comprising a catalyst material of any of the above <1> to <4>, a pair of electrodes connected to each other via the catalyst material, and a voltage detecting unit for detecting the potential difference between the electrodes, wherein hydrogen gas introduced to the side of one electrode connected with the catalyst material is contacted with the electrode in the presence of water, the hydrogen ion thus generated dissolves in water to be an aqueous acid solution, the acid solution is contacted with the catalyst and decomposed to generate electric energy, and the resulting potential difference between the electrodes is detected with the voltage detecting unit to thereby detect the hydrogen gas.

<25> A method for synthesizing acetic acid, including a step of burning a divalent manganese compound and acid-treating it.

<26> The method for synthesizing acetic acid of the above <25>, wherein the divalent manganese compound is manganese carbonate.

<27> A method for synthesizing a saccharide, including a step of burning a divalent manganese compound and acid-treating it to give aggregates of nanoparticles of mainly hydrogenated manganese dioxide, and a step of drying the aggregates in air.

<28> The method for synthesizing a saccharide of the above <27>, wherein the divalent manganese compound is manganese carbonate.

<29> A method for producing R-type manganese dioxide, which comprises adding an oxidizing agent such as hydrogen peroxide or oxygen gas and an alkali compound to an aqueous solution containing a divalent manganese ion, then acid-treating the resulting manganese oxide precipitate, and drying it.

BEST MODE FOR CARRYING OUT THE INVENTION

Figure 1:
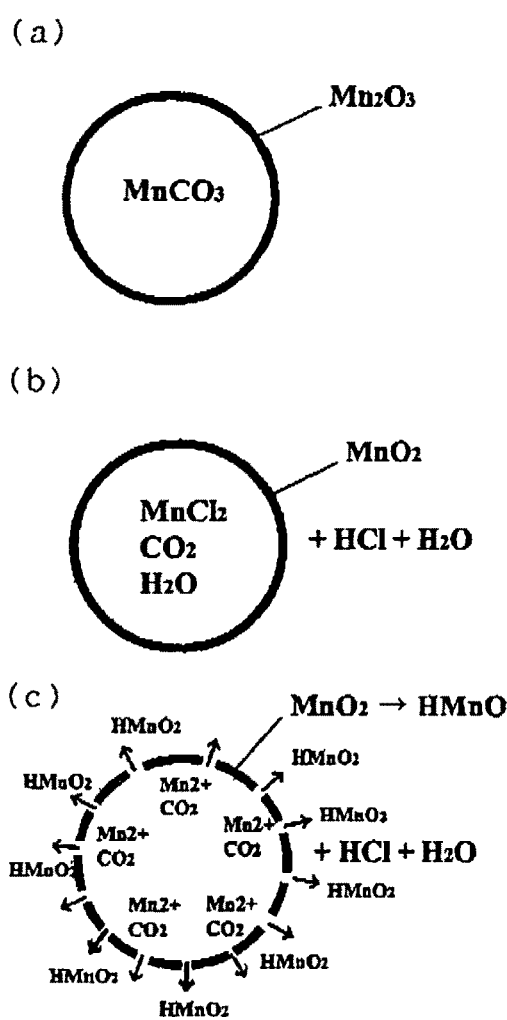
FIG. 1 is a schematic view for explaining synthesis of hydrogenated manganese oxide and the waste liquid to be generated during it.

The invention provides a catalyst material for producing oxygen gas, proton and electron from water (hereinafter this may be referred to as a catalyst material for oxygen gas production), and a catalyst material for decomposing carbon dioxide gas to synthesize acetic acid and formaldehyde or saccharide (hereinafter this may be referred to as a catalyst material for carbon dioxide decomposition). These catalyst materials are used for decomposition of water or for decomposition of carbon dioxide gas, and may be referred to as a reaction promoter.

First described is the catalyst material for producing oxygen gas, proton and electron from water.

The above-mentioned catalyst material comprises aggregates of nanoneedles of mainly R-type manganese dioxide, and is characterized in that it comprises aggregates of manganese dioxide having a mesoporous structure. The nanoneedles of mainly R-type manganese dioxide generally comprise an ingredient of at least 50% by weight, preferably at least 80%, more preferably at lest 95% of R-type manganese dioxide, and their size, or that is, their thickness (mean diameter) and length (distance between both ends) is on an nanometer scale, and they have a nearly uniform thickness and have a needle-like (rod) shape. Concretely, the thickness (mean diameter) is within a range of from 1 to 50 nm and the length (distance between both ends) is within a range of from 3 to 500 nm.

The aggregates of manganese dioxide in the catalyst material form a mesoporous structure, and those may be taken into consideration of such that the pore diameter is within a range of from 3 nm to 30 nm and the BET specific surface area is within a range of from 40 to 120 m$^2$/g. In particular, those are mentioned of such that the mean pore diameter is within a range of from 3 nm to 15 nm and the BET specific surface area is within a range of from 50 to 200 m$^2$/g, especially those of such that the mean pore diameter is within a range of from 7 nm to 14 nm and the BET specific surface area is within a range of from 50 to 130 m$^2$/g, or those of such that the mean pore diameter is within a range of from 15 nm to 30 nm and the BET specific surface area is within a range of from 40 to 50 m$^2$/g. The total pore volume of the mesoporous structure is from 0.1 to 0.5 cm$^3$/g or so. Regarding the size of the aggregates, for example, the diameter thereof may be within a range of from 1 to 100 μm in consideration of the mesoporous structure thereof.

The above-mentioned catalyst material is contacted with water on the surface and inside the pores of the porous structure, and therefore can bring about high-efficient catalytic reaction that conventional catalyst materials could not realize. Accordingly, for example, 10 g of the catalyst material dipped in water in a closed container can generate 330 ppm/hr of oxygen gas, and it enables production of oxygen gas from water at such a high reaction efficiency.

Next described is a method for producing the catalyst material for producing oxygen gas and electric energy, proton and electron, from water. The catalyst material can be obtained by burning a divalent manganese compound to give a manganese oxide powder, then acid-treating it and drying it.

The divalent manganese compound includes manganese carbonate, manganese hydroxide, manganese chloride, manganese sulfate, manganese nitrate, manganese oxalate, etc. In consideration of the availability, the production efficiency and others of the catalyst material, preferred is manganese carbonate $MnCO_3$. Regarding the size of the manganese compound, it may be taken into consideration that the compound is a powder having a mean particle size within a range of from 0.02 to 100 μm.

The burning temperature may be within a range of from 180 to 300° C., more preferably from 190 to 250° C., even more preferably 200° C. The burning time may be suitably determined in consideration of the burning temperature and the amount to be burned, and is, for example, from 1 to 20 hours or so. In burning 25 g of manganese carbonate, it may be burned at 200° C. for 6 hours.

Acid treatment may be effected once or repeatedly twice or more. Repeated acid treatment enables effective removal of the divalent manganese compound to efficiently synthesize hydrogenated manganese dioxide of a mixture of R-type crystal structure and epsilon-type crystal structure manganese dioxide. The hydrogenated manganese oxide is pasty as a result of acid treatment, and is (manganese valence +4 valence) nanoparticles of manganese dioxide $MnO_2$ with proton $H^+$ and electron e infiltrated into the crystal structure thereof. Accordingly, the hydrogenated manganese oxide may be expressed as $(H^+, e^-)_x MnO_2$. In this, x indicates the number of proton and electron $(H^+, e^-)$ in manganese dioxide $MnO_2$, falling within a range of from 0 to 1. As will be described hereinunder, when the hydrogenated manganese oxide is dried, it releases the proton and gives R-type manganese dioxide.

The frequency of the acid treatment may be suitably defined, depending on the amount of the manganese compound (burnt manganese carbonate), and the type and the concentration of the acid to be used. Not specifically defined, the acid for use for the acid treatment may be any inorganic acid but is preferably hydrochloric acid, sulfuric acid or nitric acid. When the concentration of the acid is high, the manganese compound may dissolve much therein, and therefore, the concentration range is preferably from 0.01 to 1.0 mol/l, more preferably from 0.1 to 0.5 mol/l. The acid treatment time is preferably from 10 minutes to 3 hours, more preferably 1 hour or so.

In the production method for the catalyst material in the invention, the size of the manganese dioxide nanoneedles to be obtained may be controlled and the mean pore diameter and the BET specific surface area of the mesoporous structure of the manganese dioxide nanoneedles may be controlled by changing the drying condition. For example, as the drying condition for the pasty hydrogenated manganese oxide obtained after the acid treatment, when the paste is put into a semi-closed container so that water could hardly be evaporated away from the paste, in drying it in air in a drier at from 90 to 120° C. for 2 hours to 12 hours, or that is, the dewatering condition for water removal from the paste is retarded under the condition, then the nanoneedles of the R-type manganese dioxide obtained after the drying treatment may be grown larger. Concretely, the nanoneedles of R-type manganese dioxide obtained at a rapid dewatering speed not using such a semi-closed container may have a thickness of from 2 to 10 am and a length of from 5 to 30 nm or so; but when a semi-closed container is used in drying the paste, the nanoneedles of R-type manganese dioxide obtained may have a thickness of from 10 to 30 nm and a length of from 30 to 300 nm.

In that manner, by controlling the drying condition after the acid treatment and the acid concentration in the acid treatment, the size of the R-type manganese dioxide nanoneedles can be controlled. Accordingly, not limited to the above-mentioned cases, for example, nanoneedles having a thickness of from 3 to 10 nm and a length of from 10 to 200 nm can be obtained as in the drying treatment 2 in Example 1 mentioned hereinunder.

The mean pore diameter and the specific surface area of the aggregates to be formed through aggregation of the thus-obtained R-type manganese dioxide nanoneedles depend on the thickness and the length of the R-type manganese dioxide nanoneedles constituting the aggregates. In the invention, nanoneedle aggregates can be obtained, which have a mean pore diameter falling within a range of from 3 nm to 30 nm, a BET specific surface area of from 40 to 200 m²/g, and a total pore volume falling within a range of from 0.1 to 0.5 cm³/g. For example, the aggregates composed of R-type manganese dioxide nanoneedles having a thickness of from 2 to 10 nm and a length of from 5 to 30 nm may have a mean pore diameter falling within a range of from 7 nm 14 nm, a BET specific surface area of from 50 to 130 m²/g, and a total pore volume falling within a range of from 0.2 to 0.5 cm³/g. The aggregates composed of R-type manganese dioxide nanoneedles having a thickness of from 10 to 30 nm and a length of from 30 to 300 nm may have a mean pore diameter falling within a range of from 15 nm to 70 nm, a BET specific surface area of from 40 to 50 m²/g, and a total pore volume falling within a range of from 0.1 to 0.3 cm³/g. The aggregates composed of R-type manganese dioxide nanoneedles having a thickness of from 3 to 10 nm and a length of from 10 to 200 nm may have a mean pore diameter falling within a range of from 10 nm to 20 nm, a BET specific surface area of from 45 to 70 m²/g, and a total pore volume falling within a range of from 0.15 to 0.40 cm³/g. The above-mentioned eases are some embodiments of the invention, and the relationship between the size of the nanoneedles and the mean pore diameter and the specific surface area of their aggregates is not limited to the above-mentioned cases. The nanoneedle, aggregates of mainly R-type manganese dioxide obtained according to the above-mentioned method may be ground in an agate mortar or the like, and then washed in water or in an aqueous solution at a temperature of from room temperature to 30° C. or so, or washed with hot water at a temperature of from 30° C. to 90° C., whereby the impurities such as manganese chloride adhering to the surfaces of the R-type manganese dioxide nanoneedles can be removed. After washed with water or with hot water, the aggregates of R-type manganese dioxide nanoneedles may be collected through filtration, and then dried, for example, under atmospheric pressure at 110° C. for 1 to 12 hours.

The above-mentioned treatment gives a catalyst material comprising aggregates of nanoneedles of mainly R-type manganese dioxide and having a mesoporous structure.

The invention provides a method for producing oxygen gas, proton and electron from water by the use of the above-mentioned catalyst material. Concretely, the catalyst material for oxygen gas production is contacted with an aqueous acid solution under visible light to produce oxygen gas. This is described more concretely. For example, in a closed glass-made reactor put under sunlight or fluorescent light, the above-mentioned catalyst material for oxygen gas production is suspended in water having an acidic pH, for example, dilute hydrochloric acid or dilute sulfuric acid, and stirred with a magnetic stirrer. In this stage, water is contacted with the catalyst material for oxygen gas production to generate gas. In this, for example, the cock of the glass tube for gas collection, connected to the closed glass-made reactor, is opened, and the gas in the closed glass-made reactor is sampled into a cylinder for sample gas collection. According to gas chromatography, the oxygen concentration in the air in the laboratory is compared with that of the sampled gas, whereby the gas generated in the reactor could be identified as oxygen gas. The oxygen gas generation can be represented by the following reaction formula:

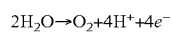

$$2H_2O \rightarrow O_2 + 4H^+ + 4e^-$$

In this, $H_2O$ means water, $O_2$ means oxygen gas, $H^+$ means hydrogen ion (proton), and $e^-$ means electron.

The above-mentioned reaction is oxidative decomposition of water, and in the invention, electric energy, proton $H^+$ and electron $e^-$, can be obtained from the oxidative decomposition of water. Specifically, contacting the above-mentioned catalyst material for oxygen gas production with an aqueous acid solution generates electric energy.

Farther, the invention provides a hydrogen gas sensor that uses the above-mentioned catalyst material. The hydrogen gas sensor comprises the above-mentioned catalyst material, a pair of electrodes connected to each other via the catalyst material, and a voltage detecting unit for detecting the potential difference between the electrodes, with which hydrogen gas is detected as follows: First, when hydrogen gas is introduced to the side of one electrode connected with the catalyst material in the presence of water, then the hydrogen gas is contacted with the electrode to generate hydrogen ion, and this is dissolved in water to give an aqueous acid solution. Next, the acid solution is contacted with the above-mentioned catalyst and decomposed to generate electric energy. With that, the resulting potential difference between the electrodes is detected with the voltage detecting unit to thereby detect the hydrogen gas. The electrode material may be any one having a catalytic effect of converting hydrogen gas into hydrogen ion, and is preferably platinum.

The above-mentioned hydrogen gas sensor can be produced inexpensively and can detect the presence of hydrogen gas in a simplified manner at high sensitivity, and is therefore favorable for practical use.

When aggregates of mainly R-type manganese dioxide nanoneedles are washed in water or in an aqueous solution at a temperature of from room temperature to 30° C. or so, or washed with hot water at a temperature of from 30° C. to 90° C. or so, thereby to remove impurities such as manganese chloride from the surfaces of the R-type manganese dioxide nanoneedles, then the surfaces of the R-type manganese dioxide nanoneedles can noticeably express proton $H^+$ conductivity. This provides a novel electrolyte for solid oxide-type fuel cells acting within a temperature range of from room temperature to 300° C. or so. In this connection, as the electrolyte in already-existing solid oxide-type fuel cells, it is known that BYCO, a compound of barium, yttrium, cerium and oxygen, acts at 500° C.; however, there are known few examples capable of expressing proton $H^+$ conductivity at such a low temperature of from room temperature to 300° C. After washed with water or with hot water, the aggregates of R-type manganese dioxide nanoneedles may be collected through filtration, and dried, for example, under atmospheric pressure at 110° C. for 1 to 12 hours.

Next, the catalyst material for synthesizing organic substances such as acetic acid and formaldehyde from carbon dioxide gas is described.

The catalyst material comprises aggregates of nanoparticles of mainly hydrogenated manganese dioxide. The nanoparticles of mainly hydrogenated manganese dioxide generally comprise an ingredient of at least 50% by weight, preferably at least 80%, more preferably at lest 95% of hydrogenated manganese dioxide, and their size, or that is, their thickness (mean diameter) and length (distance between both ends) is on an nanometer scale, and they are amorphous or have a nearly uniform thickness and have a needle-like (needle or rod) shape. More preferably, they are nanoneedles of hydrogenated manganese dioxide, and for the nanoneedles of the case, those may be taken into consideration of such that the thickness (mean diameter) and the length (distance between both ends) are within a range of from 1 to 50 nm (thickness), and within a range of from 3 to 500 nm (length), respectively, like in the above-mentioned catalyst material for production of oxygen gas from water. In the invention, the nanoneedles aggregate to form a mesoporous structure. As the mesoporous structure, one is taken into consideration that has a pore diameter falling within a range of from 3 nm to 30 nm and a BET specific surface area of from 40 to 115 $m^2/g$. In particular, there are mentioned one having a mean pore diameter of from 3 nm to 15 nm and a BET specific surface area falling within a range of from 50 to 200 $m^2/g$, especially one having a mean pore diameter of from 7 nm to 14 nm and a BET specific surface area falling within a range of from 50 to 130 $m^2/g$, or one having a mean pore diameter of from 15 nm to 30 nm and a BET specific surface area falling within a range of from 40 to 50 $m^2/g$. The total pore volume of the porous structure may be from 0.1 to 0.5 $cm^3/g$ or so. For example, in consideration of the mesoporous structure, its diameter falls within a range of from 1 to 100 μm.

The above-mentioned catalyst material contacts with water and carbon dioxide gas on the surface of the porous structure and on the inner surface of the pores, and therefore, it may bring about high-efficiency catalytic reaction that conventional catalyst materials could not realize. Accordingly, for example, only when 10 g of the catalyst material dipped in water in a closed container is contacted with carbon dioxide gas having a concentration of 99.9% with stirring with a magnetic stirrer or the like, then formaldehyde and the like generated through decomposition of carbon dioxide can be detected in the closed container after 24 hours, and in that manner, carbon dioxide gas can be decomposed at high reaction efficiency. No catalyst material is known up to the present that can attain the effect under energy application of not more than sunlight.

Next described is a method for producing the above-mentioned catalyst material for synthesizing organic substances such as acetic acid and formaldehyde from carbon dioxide gas.

The catalyst material may be produced by burning a divalent manganese compound and acid-treating it; and the catalyst material comprises aggregates of nanoparticles of mainly hydrogenated manganese dioxide of a mixture of R-type crystal structure and epsilon-type crystal structure manganese dioxide.

The divalent manganese compound includes manganese carbonate, manganese hydroxide, manganese chloride, manganese sulfate, manganese nitrate, manganese oxalate, etc. In consideration of the availability, the production efficiency and others of the catalyst material, preferred is manganese carbonate $MnCO_3$. Regarding the size of the manganese compound, it may be taken into consideration that the compound is a powder having a mean particle size within a range of from 0.02 to 100 μm.

The burning temperature may be within a range of from 180 to 300° C., more preferably from 190 to 250° C., even more preferably 200° C. The burning time may be suitably determined in consideration of the burning temperature and the amount to be burned, and is, for example, from 1 to 20 hours or so. In burning 25 g of manganese carbonate, it may be burned at 200° C. for 6 hours.

Acid treatment may be effected once or repeatedly twice or more. Repeated acid treatment enables effective removal of the divalent manganese compound to efficiently synthesize hydrogenated manganese dioxide of a mixture of R-type crystal structure and epsilon-type crystal structure manganese dioxide. The hydrogenated manganese oxide is pasty as a result of acid treatment, and is (manganese valence +4 valence) nanoparticles of manganese dioxide $MnO_2$ with proton $H^+$ and electron $e^-$ infiltrated into the crystal structure thereof. Accordingly, the hydrogenated manganese oxide may be expressed as $(H^+,e^-)_x MnO_2$. In this, x indicates the number of proton and electron $(H^+,e^-)$ in manganese dioxide $MnO_2$, falling within a range of from 0 to 1. When the hydrogenated manganese oxide is dried, it releases the proton and gives R-type manganese dioxide.

The frequency of the acid treatment may be suitably defined, depending on the amount of the manganese compound (burnt manganese carbonate), and the type and the concentration of the acid to be used. Not specifically defined, the acid for use for the acid treatment may be any inorganic acid but is preferably hydrochloric acid, sulfuric acid or nitric acid. When the concentration of the acid is high, the manganese compound may dissolve much therein, and therefore, the concentration range is preferably from 0.01 to 1.0 mol/l, more preferably from 0.1 to 0.5 mol/l. The acid treatment time is preferably from 10 minutes to 3 hours, more preferably 1 hour or so.

In the invention, after the divalent manganese compound is burned and acid-treated, it may be washed in water or in an aqueous solution at a temperature of from room temperature to 30° C. or so. Accordingly, impurities such as manganese chloride adhering to the hydrogenated manganese oxide can be removed.

In the invention, after the divalent manganese compound is burned and acid-treated, if desired, it may be washed with water and further, it may be dried and then acid-treated. The acid treatment after the drying treatment may be the same as the acid treatment after the burning treatment. The acid for use in the acid treatment after the drying treatment may be the above-mentioned inorganic acid, preferably the above-mentioned dilute hydrochloric acid having a concentration falling within a range of from 0.1 to 0.5 mol/L. The acid treatment time is preferably from 10 minutes to 3 hours or so; however, when acid water having the same pH level as that of natural acid rain, for example ion-exchanged water having a pH of 5.6 is used for the acid treatment, then the acid treatment time may be prolonged to be 2 days, thereby attaining the same effect as that of the case where dilute hydrochloric acid having a concentration of from 0.1 to 0.5 mol/L is used for the acid treatment taking 1 hour. The acid for use for the acid treatment after the drying treatment may not be limited to an inorganic acid but may be an organic acid such as trifluoroacetic acid $CF_3COOH$. Regarding the drying treatment, the drying condition may be changed to thereby control the size of the manganese dioxide nanoneedles to be obtained with controlling the mean pore diameter and the BET specific surface area of the mesoporous structure of the manganese dioxide nanoneedle aggregates. For example, regarding the drying condition for the pasty material of the hydrogenated manganese oxide nanoparticles to be obtained as a result of the above-mentioned acid treatment, the paste put in a reactor may be set in an open chamber such as a glass-made laboratory dish and dried therein in air in a drier at from 90 to 120° C. for 2 hours to 12 hours so as to accelerate the water removal from the paste, whereby the size of the R-type manganese dioxide nanoneedles to be obtained may be reduced. Concretely, R-type manganese dioxide nanoneedles having a thickness of from 2 to 10 nm and a length of from 5 to 30 nut can be produced.

On the other hand, for obtaining more largely grown R-type manganese dioxide nanoneedles, the paste may be put in a semi-closed container in which the dewatering from the paste may be retarded; or a dilute acid such as dilute hydrochloric acid may be added to the paste so as to increase the amount of the hydrogen ion in water that the paste contains, and then the paste may be dried, whereby more largely grown R-type manganese dioxide nanoneedles can be obtained. Concretely, R-type manganese dioxide nanoneedles having a thickness of from 10 to 30 nm and a length of from 30 to 300 nm can be obtained.

By controlling the drying condition and the amount of the hydrogen ion in the paste, the size of the R-type manganese dioxide nanoneedles to be obtained after the drying treatment may be controlled. Accordingly, not limited to the above-mentioned cases, for example, the drying condition and the amount of the hydrogen ion in the paste can be suitably controlled and changed to thereby obtain nanoneedles having a thickness of from 3 to 10 nm and a length of from 10 to 200 nm.

The mean pore diameter and the specific surface area of the R-type manganese dioxide nanoneedle aggregates depend on the thickness and the length of the R-type manganese dioxide nanoneedles. In the invention, nanoneedle aggregates can be obtained, which have a mean pore diameter falling within a range of from 3 nm to 30 nm, a BET specific surface area of from 40 to 200 $m^2/g$, and a total pore volume falling within a range of from 0.1 to 0.5 $cm^3/g$. For example, the aggregates composed of R-type manganese dioxide nanoneedles having a thickness of from 2 to 10 nm and a length of from 5 to 30 nm may have a mean pore diameter falling within a range of from 7 nm 14 nm, a BET specific surface area of from 50 to 130 $m^2/g$, and a total pore volume falling within a range of from 0.2 to 0.5 $cm^3/g$. The aggregates composed of R-type manganese dioxide nanoneedles having a thickness of from 10 to 30 μm and a length of from 30 to 300 nm may have a mean pore diameter falling within a range of from 15 nm to 30 nm, a BET specific surface area of from 40 to 50 $m^2/g$, and a total pore volume falling within a range of from 0.1 to 0.3 $cm^3/g$.

The aggregates composed of R-type manganese dioxide nanoneedles having a thickness of from 3 to 10 nm and a length of from 10 to 200 nm may have a mean pore diameter falling within a range of from 10 nm to 20 nm, a BET specific surface area of from 45 to 70 $m^2/g$, and a total pore volume falling within a range of from 0.15 to 0.40 $cm^3/g$. The above-mentioned cases are some embodiments of the invention, and the relationship between the size of the nanoneedles and the mean pore diameter and the specific surface area of their aggregates is not limited to the above-mentioned cases. The nanoneedle aggregates of mainly R-type manganese dioxide obtained according to the above-mentioned method may be ground in an agate mortar or the like, and then washed in water or in an aqueous solution at a temperature of from room temperature to 30° C. or so, or washed with hot water at a temperature of from 30° C. to 90° C., whereby the impurities such as manganese chloride adhering to the surfaces of the R-type manganese dioxide nanoneedles can be removed. After washed with water or with hot water, the aggregates of R-type manganese dioxide nanoneedles may be collected through filtration, and then dried, for example, under atmospheric pressure at 110° C. for 1 to 12 hours.

Acid treatment of the R-type manganese dioxide nanoneedle aggregates obtained in the manner as above gives a paste of aggregates of nanoneedles of hydrogenated manganese oxide $(H^+, e^-)_x MnO_2$ with proton $H^+$ ad electron $e^-$ infiltrated thereinto. Accordingly, a catalyst material of aggregates of nanoneedles of mainly hydrogenated manganese dioxide and having a mesoporous structure can be obtained. The catalyst material has high porosity and has a large specific surface area, and is therefore favorable as a catalyst material for decomposition of carbon dioxide gas.

Next described is a method for synthesizing acetic acid. The method for synthesizing acetic acid includes two methods. The first method comprises burning the above-mentioned divalent manganese compound, and then acid-treating it to produce a paste of aggregates of nanoparticles of mainly hydrogenated manganese oxide, and during this process, acetic acid is synthesized. Concretely, it may be considered that, in the acid treatment with dilute hydrochloric acid, the nanoparticles of mainly hydrogenated manganese dioxide formed in the dilute hydrochloric acid are contacted with the carbon dioxide gas bubbled from the above-mentioned divalent manganese compound to give lower organic substances such as unstable aldehydes, and the lower organic substances may be further oxidized, after having received the effect of the manganese ion $Mn^{2+}$ and hypochlorous acid in the dilute hydrochloric acid, as a result thereby forming stable acetic acid. With the progress of the acid treatment, an acetic acid smell is generated, and after the acid treatment, the presence of acetic acid $CH_3COOH$ in the dilute hydrochloric acid separated by solid-liquid separation is confirmed through a mass spectrometric device with a gas chromatograph directly bonded thereto (GCMS method). In this process, the presence of other minor side products, butyrolactone, acetone, ethyl ether, ethyl acetate and tetrahydrofuran is confirmed in addition to the main product, acetic acid. These may be minor intermediates having remained in the hydrochloric acid in the process of finally producing acetic acid therein.

The second method comprises contacting the above-mentioned aggregates of nanoparticles of mainly hydrogenated manganese dioxide with carbon dioxide gas in the presence of an aqueous acid solution to thereby synthesize acetic acid. Concretely, the above-mentioned aggregates of nanoparticles of mainly hydrogenated manganese dioxide are suspended in an aqueous dilute hydrochloric acid solution, and with stirring it with a magnetic stirrer or the like, carbon dioxide gas bubbles are bubbled into the aqueous dilute hydrochloric acid solution whereby the nanoparticle aggregates of mainly hydrogenated manganese dioxide are efficiently contacted and reacted with the carbon dioxide gas. This is continued for about 2 days, and then the nanoparticle aggregates of mainly hydrogenated manganese dioxide are separated from the aqueous dilute hydrochloric acid solution through solid-liquid separation. The thus-separated aqueous dilute hydrochloric acid solution is analyzed through a mass spectrometric device with a gas chromatograph directly bonded thereto (GCMS method), thereby confirming the presence of acetic acid $CH_3COOH$. In this process, the presence of other minor side products, butyrolactone, acetone, ethyl ether, ethyl acetate and tetrahydrofuran is confirmed in addition to the main product, acetic acid. These may be minor intermediates having remained in the hydrochloric acid in the process of finally producing acetic acid therein.

In any of these methods for synthesis of acetic acid mentioned above, it is desirable that the nanoparticles of mainly hydrogenated manganese dioxide are contacted with carbon dioxide gas under visible light. This is because, under visible light, the proton and the hydrogen charged on the surface of the hydrogenated manganese dioxide are released, and then water is oxidatively decomposed on the surface and proton and hydrogen are again charged on the surface, therefore enabling continuous reduction of carbon dioxide.

Next described is a method for synthesizing formaldehyde from carbon dioxide gas. This method comprises suspending the above-mentioned catalyst material for carbon dioxide decomposition in an aqueous solution, and contacting the suspension with carbon dioxide gas to decompose the carbon dioxide gas, thereby synthesizing formaldehyde. This is described more concretely. For example, the catalyst material for carbon dioxide decomposition of the invention is suspended in water in a glass-made reactor, and stirred with a magnetic stirrer. Simultaneously, carbon dioxide gas having a concentration of 99.9% is filled in the reactor. A Teflon® tube for guiding out the gas generated inside the reactor is disposed at the top of the reactor, and the Teflon® tube is connected to another closed container filled with carbon dioxide gas and containing a few ml of water at the bottom thereof. This condition is kept as such for 24 hours, whereupon the formaldehyde gas generated as a result of the reaction of the carbon dioxide gas with the catalyst material for carbon dioxide decomposition in the closed container is dissolved in a few ml of water in the closed container and is trapped therein. After 24 hours, the closed containers are opened, and first, (1) a smell peculiar to formaldehyde is taken. (2) According to an acetylacetone method in Methods of Analysis in Health Science, Explanatory Notes (by The Pharmaceutical Society of Japan), a color reaction indicating the presence of formaldehyde dissolved in a few ml of water in the closed container is confirmed. (3) Water having colored in (2) is analyzed with a spectrophotometer at a wavelength of 413 nm, thereby confirming the presence of dissolved formaldehyde.

According to the above-mentioned method, formaldehyde can be detected in the reaction system in which formaldehyde does not exist at all. This proves the decomposition of carbon dioxide gas by the catalyst material for carbon dioxide gas of the invention. Also in this method, it is desirable that carbon dioxide gas is contacted with the catalyst material for carbon dioxide gas decomposition under visible light. This is because, under visible light, the proton and the hydrogen charged on the surface of the hydrogenated manganese dioxide are released, and then water is oxidatively decomposed on the surface and proton and hydrogen are again charged on the surface, therefore enabling continuous reduction of carbon dioxide.

In the above-mentioned cases, the catalyst material suspended in water is stirred with a magnetic stirrer to thereby increase the contact efficiency between water and carbon dioxide gas; but in actual industrial plants, for example, an exhaust gas discharged from a factory is introduced into a reactor in which the catalyst material for carbon dioxide decomposition of the invention is added to water, and by the bubbling power of the exhaust gas itself, the gas may be fully efficiently contacted with the catalyst material for carbon dioxide decomposition, and therefore, it may be said the application of stirring energy by using a magnetic stirrer or the like may be omitted.

The invention further provides a method for synthesizing a saccharide. In this method, first, the above-mentioned divalent manganese compound is burned and then acid-treated to produce a paste of aggregates of nanoparticles of mainly hydrogenated manganese dioxide. Next, the aggregate paste is dried in air to synthesize a saccharide. In an alternative method, an aqueous solution containing a divalent manganese is prepared, and an oxidizing agent and an alkali compound are added to the aqueous solution to precipitate manganese oxide. Then, the manganese oxide precipitate is collected on a filter paper through filtration through a reduced pressure filter unit, and thereafter white the manganese oxide precipitate is still wet with the filtrate, this is directly suspended in a dilute acid and acid-treated therein for about 1 hour. After the acid treatment, the manganese oxide precipitate is again collected on a filter paper through a reduced pressure filter unit, and the thus-collected hydrogenated manganese dioxide is transferred onto a glass-made laboratory dish and dried in air, thereby synthesizing a saccharide. In any of these methods, during the heat treatment, a transparent liquid is bled out from the aggregate paste or from the hydrogenated manganese dioxide precipitate, and after the drying treatment, this is solidified as a white powder. The main ingredient of the thus-obtained white powder is manganese chloride, but it contains the intended glucose, in which the synthesis of the saccharide can be confirmed.

Next described is a method of recycling a waste liquid of the invention.

The waste liquid is the acid treatment liquid after the acid treatment, which results from the acid treatment of a burned divalent manganese compound with an acid-treating liquid, in the above-mentioned method for producing a catalyst material for producing oxygen gas from water, or in the above-mentioned method for producing a catalyst material for synthesizing acetic acid, formaldehyde or a saccharide from carbon dioxide gas; and the waste liquid is an aqueous solution containing a divalent manganese ion. This is described in more detail hereinunder.

In the above-mentioned method for producing a catalyst material, when manganese dioxide $MnCO_3$ (divalent manganese compound) is burned at a low temperature (for example, burned at a temperature of from 180 to 300° C.), then the surface of manganese carbonate is oxidized to give burnt manganese carbonate with a shell of manganese oxide $Mn_2O_3$, as in FIG. 1(a). Next, for example, the burnt manganese carbonate is put and suspended in an acid-treating liquid such as dilute hydrochloric acid, and acid-treated therein. As a result of the acid treatment, the shell manganese oxide $Mn_2O_3$ is contacted with dilute hydrochloric acid to generate chlorine gas. As influenced by the chlorine gas, the shell manganese oxide $Mn_2O_3$ is converted into manganese oxide $MnO_2$, and the manganese carbonate $MnCO_3$ inside the shell is converted into manganese chloride $MnCl_2$ and carbon dioxide $CO_2$ and water $H_2O$ (FIG. 1(b)). The manganese chloride $MnCl_2$ changes into a manganese ion $Mn^{2+}$, and the carbonate ingredient changes into carbon dioxide gas $CO^2$ to thereby increase the inner pressure inside the shell, and as a result, the carbon dioxide bubbles containing a manganese ion $Mn^{2+}$ bubble out along with water $H_2O$ through the surface of the shell of manganese dioxide. During the bubbling, the manganese ion $Mn^{2+}$ may be efficiently contacted with the shell of manganese dioxide $MnO_2$, therefore causing oxidation of the manganese ion $Mn^{2+}$ to give hydrogenated manganese oxide (FIG. 1(c)). Further, it may be considered that a part of the generated carbon dioxide gas may be contacted with hydrogenated manganese oxide in water and may be thereby converted into a lower organic substance such as aldehydes, and this may be oxidized with the manganese ion $Mn^{2+}$ in water or with the oxidizing agent component such as hypochlorous acid to be generated by dilute hydrochloric acid and manganese dioxide, thereby forming acetic acid. On the other hand, a part of manganese ion $Mn^{2+}$ is not oxidized but remains as such. The remaining manganese ion $Mn^{2+}$ is kept dissolving in the acid-treating liquid, and the acid-treating liquid containing the manganese ion $Mn^{2+}$ is a waste liquid.

The above-mentioned, manganese ion $Mn^{2+}$-containing acid-treating liquid (aqueous solution containing a divalent manganese ion) contains manganese chloride dissolving in water when hydrochloric acid is used as the acid-treating liquid; and contains manganese sulfate dissolving in water when sulfuric acid is used; and contains manganese nitrate dissolving in water when nitric acid is used. This is based on the process that an oxidizing agent and an alkali compound are added to an aqueous solution prepared by dissolving the reagent, manganese chloride, manganese sulfate or manganese nitrate in water, to thereby precipitate manganese oxide, then it is collected through filtration, the thus-collected manganese oxide precipitate is acid-treated and then dried to give R-type manganese dioxide.

Regarding the concentration of the acid-treating liquid for acid treatment, when the acid concentration is high, then the manganese compound may much dissolve in the liquid, as so mentioned in the above; and therefore, the concentration range is preferably from 0.01 to 1.0 mol/l, more preferably from 0.1 to 0.5 mol/l. In consideration of recycling the waste liquid, the amount of the burned manganese carbonate to be processed in acid treatment is preferably from 50 g to 70 g relative to 2 liter of dilute acid having a concentration of 0.5 mol/l, more preferably from 55 g to 65 g, even more preferably 60 g or so. The reason is because, when the amount of burnt manganese carbonate to be suspended in 2 liter of a dilute acid having a concentration of 0.5 mol/l is less than 50 g, then the concentration of the +2-valent manganese ion $Mn^{2+}$ in the formed aqueous solution may be low, and if so, the amount of the manganese ion capable of reacting with the oxidizing agent hydrogen peroxide and the alkali compound sodium hydroxide added in the method of recycling a waste liquid of the invention may be short, as will be described hereinunder, and finally therefore, the amount of R-type manganese dioxide to be obtained from 1 liter of the aqueous solution may decrease, and it is unfavorable. In addition, when the amount of the burnt manganese carbonate to be suspended is less than 50 g, then the generation of water along with the dissolution of manganese carbonate may decrease and the pH of the dilute acid could not increase so much. This results in increasing the amount of expensive sodium hydroxide to be added in the next step, and is therefore unfavorable from the viewpoint of process costs. The dissolution of manganese carbonate can be expressed by the following formula, and this is in a process of acid treatment of burnt manganese carbonate with dilute hydrochloric acid.

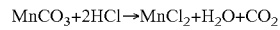

$$MnCO_3 + 2HCl \rightarrow MnCl_2 + H_2O + CO_2$$

In case where the amount of burnt manganese carbonate to be suspended in 2 liters of a dilute acid having a concentration of 0.5 mol/l is more than 70 g, the pH of the dilute acid may reach neutral owing to generation of water through the dissolution of manganese carbonate, therefore giving undissolved manganese carbonate. Accordingly, the frequency of acid treatment must be increased and, as a result, the cost for the acid treatment process may increase. Therefore, in case where 2 liters of a dilute acid having a concentration of 0.5 mol/liter is used in the acid treatment, about 60 g of burnt manganese carbonate is suspended so that the pH of the aqueous solution could be weakly acidic, and the acid treatment may be effected once in that condition.

The method of recycling a waste liquid of the invention comprises adding an oxidizing agent and an alkali compound to the waste liquid to precipitate manganese oxide. The manganese oxide precipitate is collected on a filter paper through filtration through a reduced pressure filter unit or the like, and while the manganese oxide precipitate is still wet with the filtrate, it is directly suspended in a dilute acid for acid treatment therein for about 1 hour. After the acid treatment, the manganese oxide precipitate is again collected on a filter paper through a reduced pressure filter unit, and the thus-collected manganese dioxide is transferred onto a glass-made laboratory dish and dried in a drier at 120° C. for 12 hours or so. A series of the process gives nanoparticles of R-type manganese dioxide as aggregates thereof. Thus obtained, the R-type manganese dioxide aggregates can be used as a catalyst material.

The oxidizing agent for use in the invention takes an electron from the divalent manganese ion in a waste liquid, including, for example, hydrogen peroxide, ozone, oxygen, nitric acid, etc. From the viewpoint of the cost, the safety and the oxidizing power thereof as an oxidizing agent, preferred is hydrogen peroxide. For example, in case where ozone is used as the oxidizing agent, its oxidizing power is higher than that of hydrogen peroxide and therefore, R-type manganese dioxide to be obtained finally may be contaminated with any other crystal structure than the R-type one. Accordingly, in the case, R-type manganese dioxide having a lower purity than that in a case of using hydrogen peroxide may be produced. In addition, when oxygen is used, its oxidizing power is lower than that of hydrogen peroxide and therefore it may take a long reaction time for producing R-type manganese dioxide, and it may require a specific method for introducing oxygen into the reaction system. As the alkali compound for precipitating manganese oxide, preferred is sodium hydroxide. Apart from it, any other alkali compound such as potassium hydroxide, lithium hydroxide, calcium hydroxide or the like may also be used. Regarding the order in adding the oxidizing agent and the alkali compound to the aqueous divalent manganese ion solution, the oxidizing agent may be added first, or the alkali compound may be added first.

The acid treatment of the manganese oxide precipitate and the subsequent drying treatment thereof may be the same as the acid treatment and the drying treatment in producing the above-mentioned catalyst material, and the description thereof is omitted herein.

Another mode of the method of recycling a waste liquid of the invention comprises adding potassium permanganate to a waste liquid followed by keeping it stirred to give a precipitate. The precipitate is collected through filtration and dried to give manganese dioxide. In the invention, an alkali metal carbonate such as sodium carbonate, potassium carbonate, lithium carbonate or the like, or an alkaline earth metal carbonate such as calcium carbonate, barium carbonate, strontium carbonate or the like may be added to a waste liquid, and kept stirred for carbonation, thereby giving manganese carbonate $MnCO_3$. The manganese carbonate may be used as the starting compound for producing the catalyst material of the invention.

According to the invention as described in the above, a waste liquid can be effectively recycled. According to the above-mentioned method, manganese ions can be removed from a waste liquid inexpensively and easily, not requiring any expensive purification treatment, and therefore, the method is useful for waste treatment.

Further, the invention provides a novel method for producing R-type manganese dioxide. According to the production method, first, an aqueous solution containing a divalent manganese ion is prepared, and an oxidizing agent and an alkali compound are added to the aqueous solution to precipitate manganese oxide. Next, the manganese oxide precipitate is collected on a filter paper through filtration through a reduced pressure filter unit or the like, and while the manganese oxide precipitate is still wet with the filtrate, it is directly suspended in a dilute acid for acid treatment therein for about 1 hour. After the acid treatment, the manganese oxide precipitate is again collected on a filter paper through a reduced pressure filter unit, and the thus-collected manganese dioxide is transferred onto a glass-made laboratory dish and dried in a drier at 120° C. for 12 hours or so. A series of the process gives nanoparticles of R-type manganese dioxide as aggregates thereof. The production method is the same as the method for producing R-type manganese dioxide in the above-mentioned method for recycling a waste liquid, and the same oxidizing agent and alkali compound may be used in the method. For example, the oxidizing agent for use in the invention takes an electron from the divalent manganese ion in a waste liquid, including, for example, hydrogen peroxide, oxygen, ozone, nitric acid, etc. From the viewpoint of the cost, the safety and the oxidizing power thereof as an oxidizing agent, preferred is hydrogen peroxide. As the alkali compound for precipitating manganese oxide, preferred is sodium hydroxide. Apart from it, any other alkali compound such as potassium hydroxide, lithium hydroxide, calcium hydroxide or the like may also be used.

As the aqueous solution containing a divalent manganese ion, usable is one prepared by dissolving a +2-valent manganese salt such as manganese chloride, manganese sulfate, manganese oxalate, manganese nitrate or the like in an aqueous solution of a dilute acid or the like. Needless-to-say, since the above-mentioned waste liquid contains a divalent manganese ion, it may also be used as the aqueous solution in the invention.

The acid treatment of the manganese oxide precipitate and the subsequent drying treatment thereof may be the same as the acid treatment and the drying treatment in producing the above-mentioned catalyst material, or the acid treatment and the drying treatment in the method for recycling a waste liquid, and the description thereof is omitted herein.

The invention is described in more detail with reference to the following Examples. Needless-to-say, the embodiments of the invention are not restricted by the following Examples.

EXAMPLES

Example 1

Method for Producing Catalyst Material for Producing Oxygen Gas from Water (Catalyst Material for Oxygen Gas Production)

(Burning)

25 g of a powder of manganese carbonate having a purity of 99.9% (Wako Pure Chemical Industries' special grade reagent) put in a magnetic crucible was burned in an electric furnace at 200° C. for 6 hours to give a burnt manganese carbonate powder.

(Acid Treatment)

50 g of the burnt manganese carbonate powder was suspended in 2 L of dilute hydrochloric acid (0.5 mol/L), stirred for 1 hour, and filtered under suction through a 0.2 micromesh glass fiber filter paper (Advantech's GS25) for solid-liquid separation. The solid substance separated on the glass fiber filer paper was again suspended in 1 L of dilute hydrochloric acid (0.5 mol/L), stirred for 1 hour, and again filtered under suction for solid-liquid separation. Through the operation, the burnt manganese carbonate became a hydrogenated substance of a mixture composition of R-type crystal structure-having manganese dioxide and epsilon-type crystal structure-having manganese dioxide. For identification of the crystal structure, used was SPring-8 radiation X-ray diffractiometry. When the acid for use in the acid treatment was changed from dilute hydrochloric acid to dilute sulfuric acid or dilute nitric acid, then the same result was obtained.

(Drying Treatment 1: for Synthesizing R-Type Manganese Dioxide Needles Having a Diameter of from 2 to 10 nm and a Length of from 5 to 30 nm)

A paste of the hydrogenated substance obtained after the acid treatment was transferred onto a glass-made laboratory dish, and dried in an electric furnace under atmospheric pressure at 100° C. for 12 hours to give manganese dioxide mainly having an R-type crystal structure. Regarding the morphology of the product to be obtained after drying herein, the circular tabular disc immediately after suction filtration on the glass filter paper after the acid treatment is dried and shrunk to give flakes or blocks having a size on a centimeter order. Accordingly, if desired, they may be ground in an agate mortar to be a powder on a micrometer order.

Figure 2:
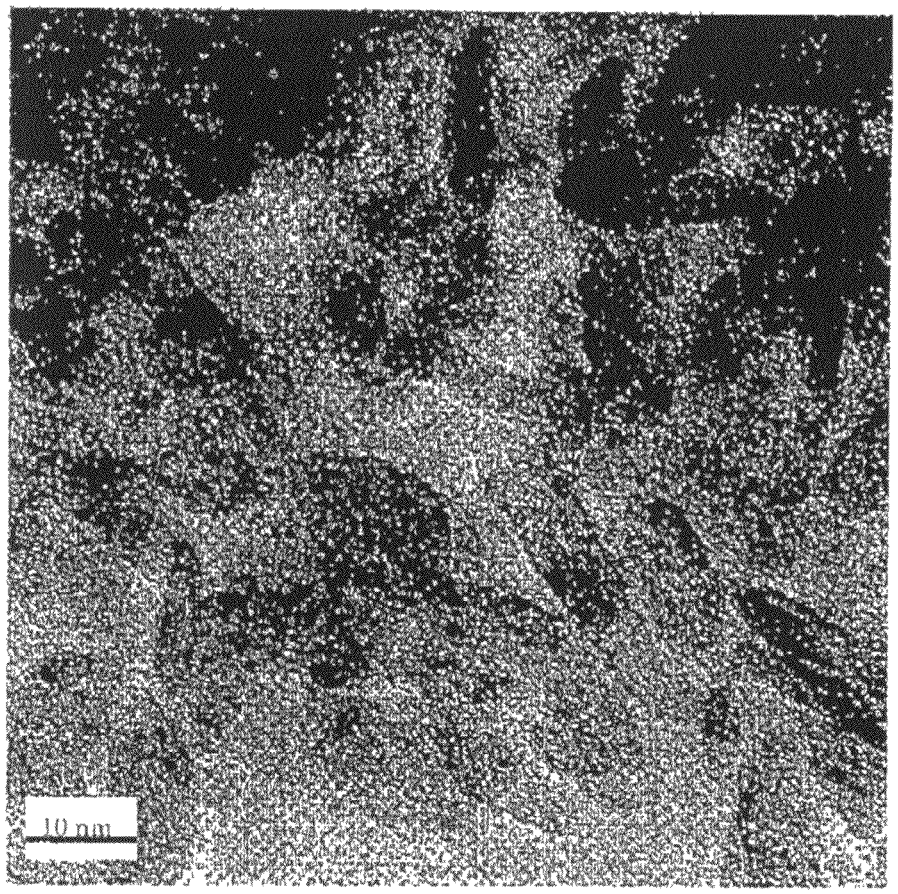
FIG. 2 is a transmission electromicroscopic picture of the catalyst material of Example 1.
Figure 3:
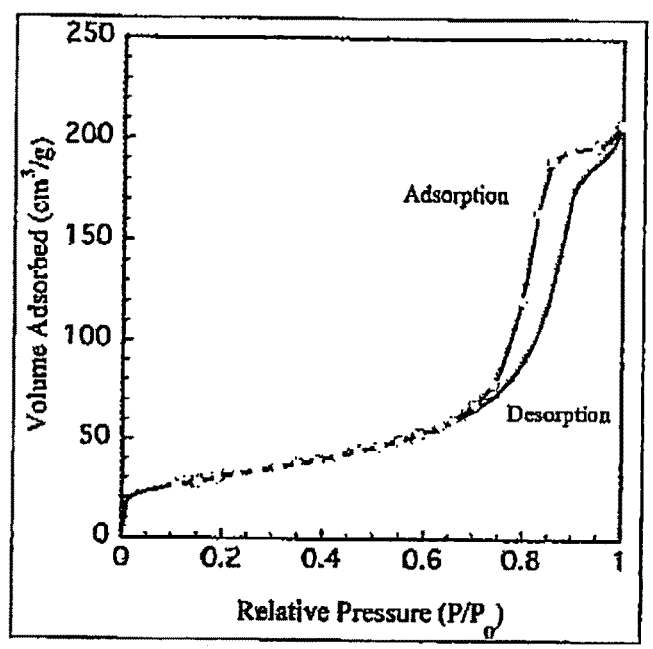
FIG. 3 is an adsorption-desorption isotherm of nitrogen gas to the aggregate powder in Example 1.
Figure 4:
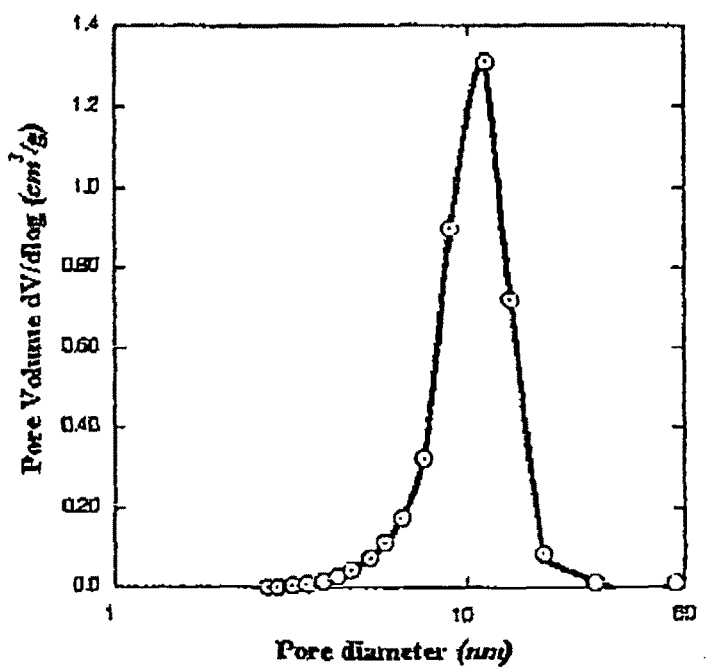
FIG. 4 is a pore distribution according to a nitrogen gas adsorption method of the aggregate powder in Example 1.

The obtained substance gave diffraction peaks of R-type manganese dioxide in powder X-ray diffractiometry; and in the substance, the manganese valence was identified as tetravalence in X-ray absorptiometry. From these, the obtained substance was identified as R-type manganese dioxide. The substance was observed with a transmission electromicroscope, which confirmed formation of a lot of powdery aggregates of nanoneedles having a diameter of 3 nm and a length of 5 nm or so. Further, in surface analysis through nitrogen gas absorptiometry, it was confirmed that the obtained aggregate powder had a mesoporous structure having a mean pore diameter of 10 nm or so. FIG. 2 is a transmission electromicroscopic picture of the obtained catalyst material. FIG. 3 is a nitrogen gas adsorption-desorption isotherm indicating that the aggregate powder has a mesoporous structure. FIG. 4 shows found data of a pore distribution according to a nitrogen gas adsorption method, which indicates that the aggregate powder has a pore distribution peak at a pore diameter of 10 nm. The BET specific surface area was 109.3 $m^2$/g, and the pore volume was 0.32 $m^3$/g.

Figure 5:
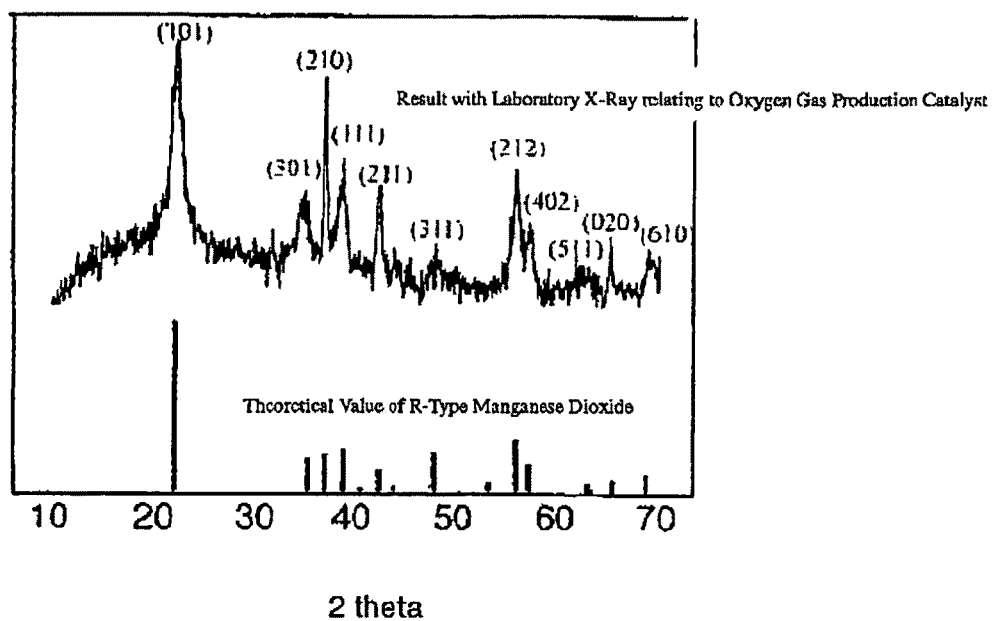
FIG. 5 is an X-ray diffraction pattern of the aggregate powder in Example 1.

FIG. 5 is a laboratory powdery X-ray diffraction pattern of the aggregate powder indicating that the obtained aggregate powder is R-type manganese dioxide. In the drawing, the position of the angle of diffraction that gives a theoretical diffraction peak of R-type manganese dioxide is shown, taken from the data in a reference (Fong, C., Kennedy, B. J., Elcombe, M. M.; Zeitschrift Fuer Kristallographie, 1994, 209, 941).

(Drying Treatment 2: for Synthesizing R-Type Manganese Dioxide Needles Having a Diameter of from 3 to 10 nm and a Length of from 10 to 200 nm)

A paste of the hydrogenated substance obtained after the acid treatment was transferred onto a glass-made laboratory dish, the glass-made laboratory dish was sealed up with two sheets of glass filter paper (Advantech's GS-25) infiltrated with 0.5 M dilute hydrochloric acid, and in that condition, this was dried in an electric furnace under atmospheric pressure at 100° C. for 12 hours to give manganese dioxide mainly having an R-type crystal structure. Regarding the morphology of the product to be obtained after drying herein, the circular tabular disc immediately after suction filtration on the glass filter paper after the acid treatment is dried and shrunk to give flakes or blocks having a size on centimeter order. Accordingly, if desired, they may be ground in an agate mortar to be a powder on a micrometer order.

Figure 6:
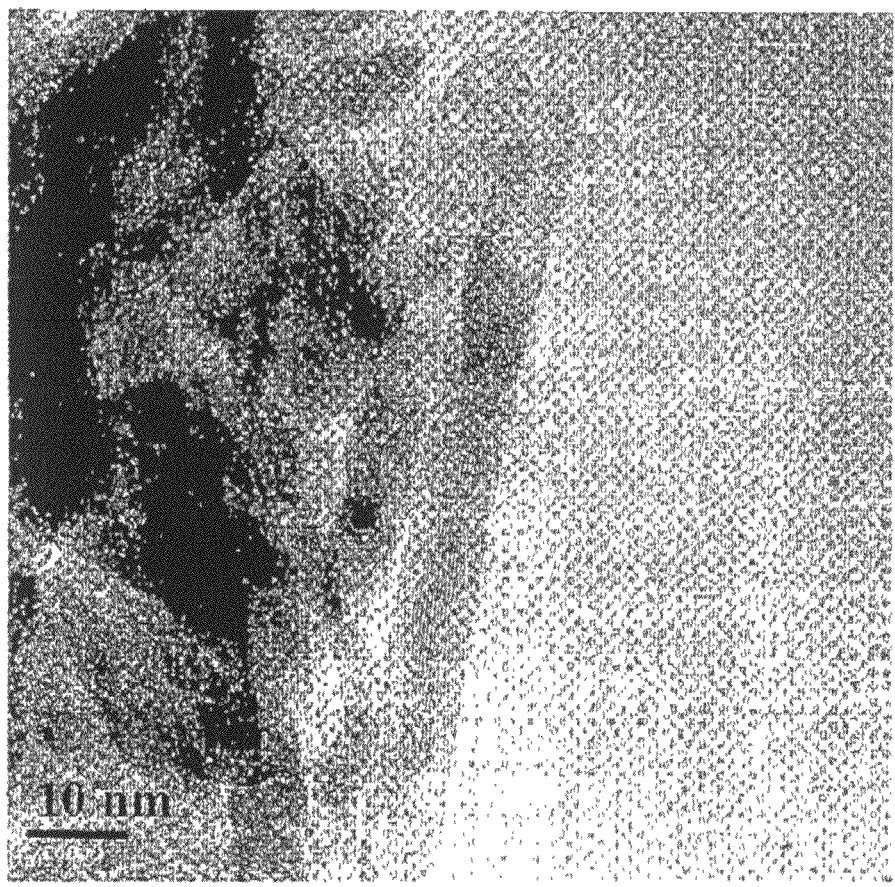
FIG. 6 is a transmission electromicroscopic picture of the catalyst material of Example 1.
Figure 7:
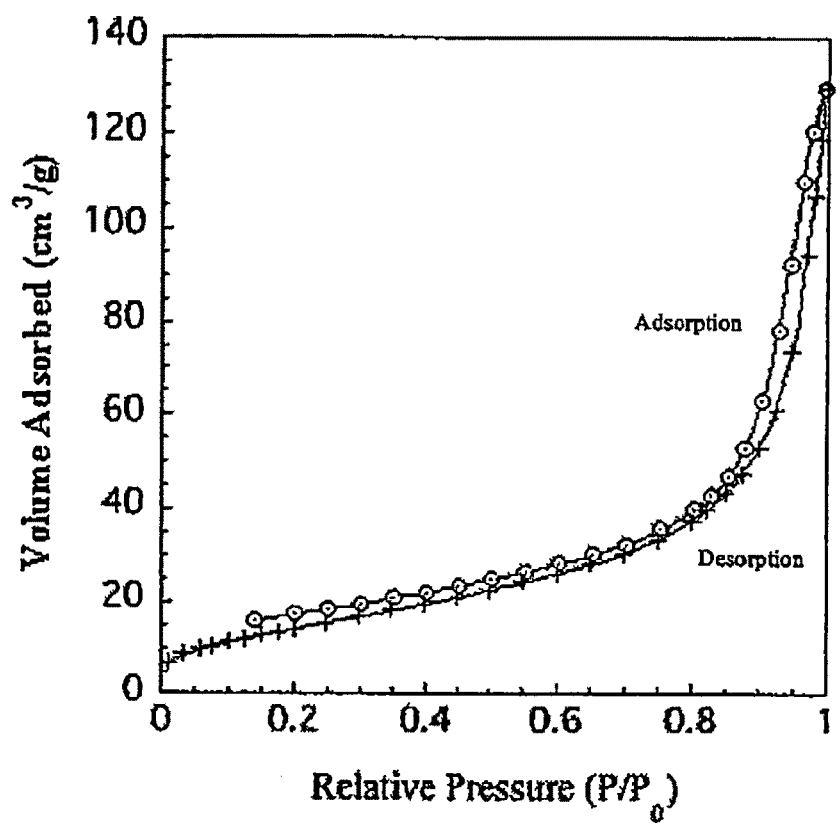
FIG. 7 is an adsorption-desorption isotherm of nitrogen gas to the aggregate powder in Example 1.
Figure 8:
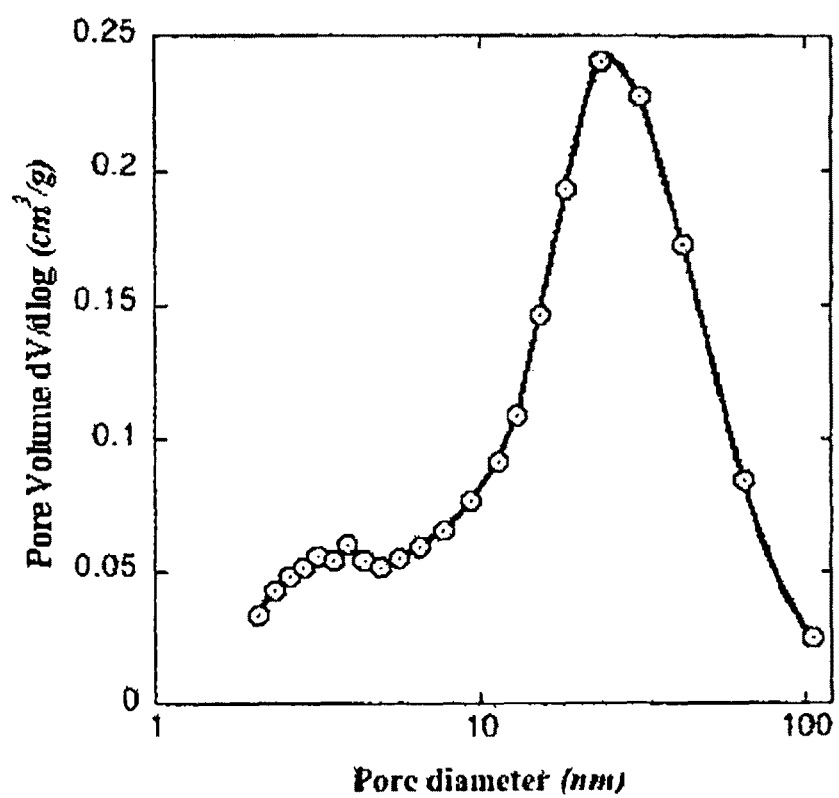
FIG. 8 is a pore distribution according to a nitrogen gas adsorption method of the aggregate powder in Example 1.

The obtained substance was observed with a transmission electromicroscope, which confirmed formation of a lot of powdery aggregates of nanoneedles having a diameter of from 3 to 10 nm and a length of from 10 to 200 nm or so. Further, in surface analysis through nitrogen gas absorptiometry, it was confirmed that the obtained aggregate powder had a mesoporous structure having a mean pore diameter of 10 nm or so. FIG. 6 is a transmission electromicroscopic picture of the obtained catalyst material. FIG. 7 is a nitrogen gas adsorption-desorption isotherm indicating that the aggregate powder has a mesoporons structure. FIG. 8 shows found data of a pore distribution according to a nitrogen gas adsorption method, which indicates that the aggregate powder has a pore distribution peak at a pore diameter of 25 nm or so. The BET specific surface area was 53.7 $m^2/g$, the mean pore diameter was 14.9 nm, and the pore volume was 0.20 $m^3/g$.

(Drying Treatment 3: for Synthesizing R-Type Manganese Dioxide Needles Having a Diameter of from 10 to 30 nm and a Length of from 30 to 300 nm)

A paste of the hydrogenated substance obtained after the acid treatment was, with 1 mL of 0.5 M dilute hydrochloric acid dropwise added thereto, transferred onto a glass-made laboratory dish, this was sealed up with two sheets of glass filter paper (Advantech's GS-25) infiltrated with 0.5 M dilute hydrochloric acid. Further, the glass-made laboratory dish with the paste and the dilute hydrochloric acid-infiltrated glass filter paper therein was covered with a glass-made laboratory dish having a larger outer diameter than it. This was put in an electric furnace and dried therein under atmospheric pressure at 100° C. for 12 hours to give manganese dioxide mainly having an R-type crystal structure. Regarding the morphology of the product to be obtained after drying herein, the circular tabular disc immediately after suction filtration on the glass filter paper after the acid treatment is dried and shrunk to give flakes or blocks having a size on a centimeter order. Accordingly, if desired, they may be ground in an agate mortar to be a powder on a micrometer order.

Figure 9:
FIG. 9 is a transmission electromicroscopic picture of the catalyst material of Example 1.
Figure 10:
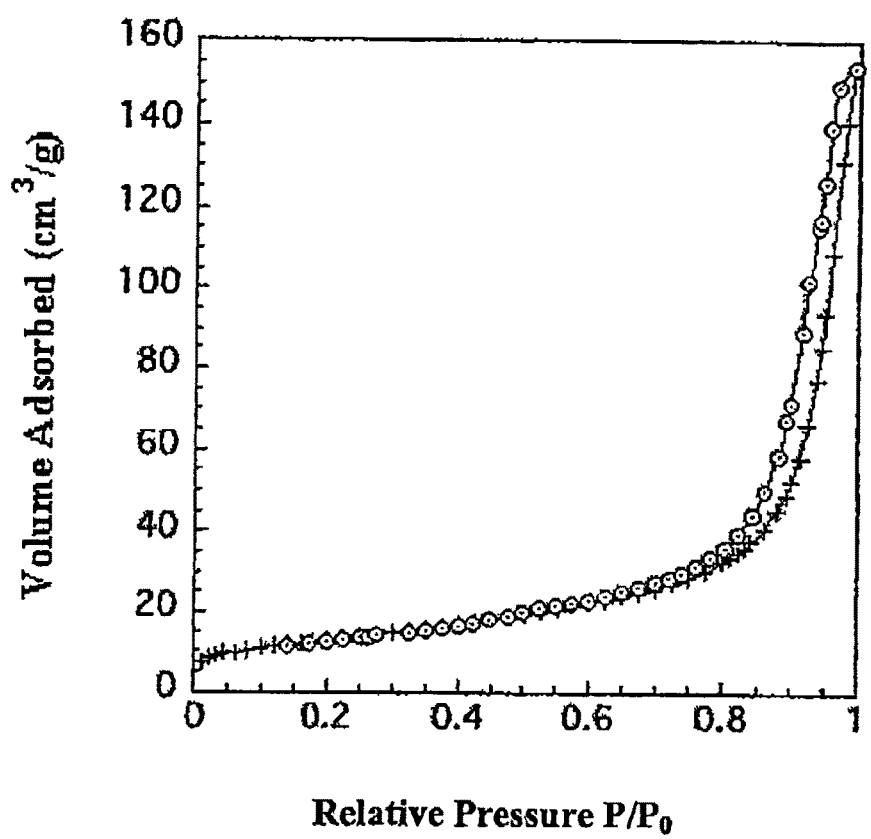
FIG. 10 is an adsorption-desorption isotherm of nitrogen gas to the aggregate powder in Example 1.
Figure 11:
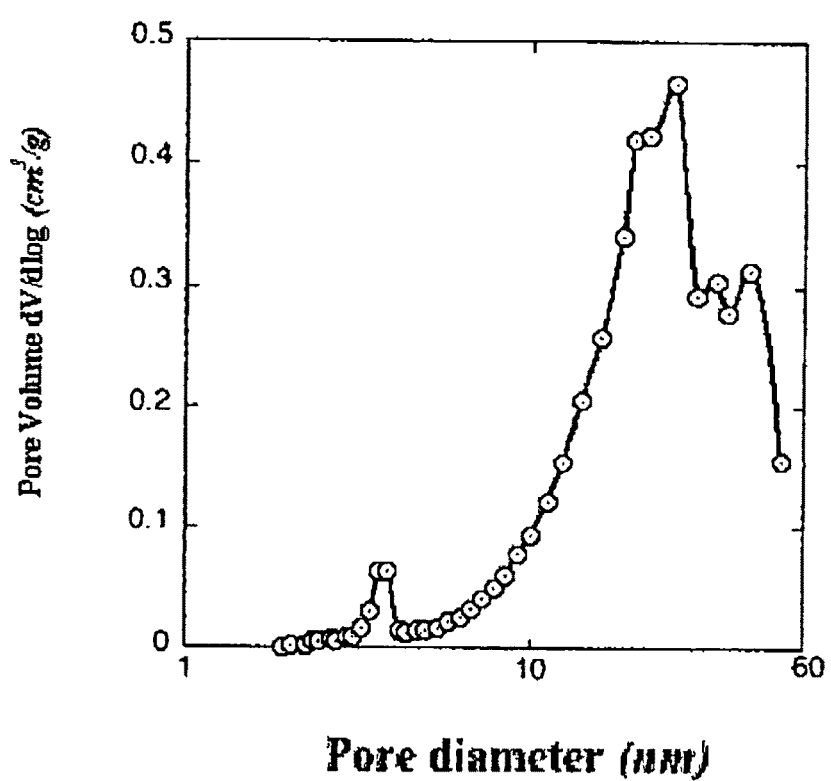
FIG. 11 is a pore distribution according to a nitrogen gas adsorption method of the aggregate powder in Example 1.

The substance was observed with a transmission electromicroscope, which confirmed formation of a lot of powdery aggregates of nanoneedles having a diameter of from 10 to 30 nm and a length of from 30 to 300 nm or so. Further, in surface analysis through nitrogen gas absorptiometry, it was confirmed that the obtained aggregate powder had a mesoporous structure having a mean pore diameter of 18.7 nm or so. FIG. 9 is a transmission electromicroscopic picture of the obtained catalyst material. FIG. 10 is a nitrogen gas adsorption-desorption isotherm indicating that the aggregate powder has a mesoporous structure. FIG. 11 shows found data of a pore distribution according to a nitrogen gas adsorption method, which indicates that the aggregate powder has a pore distribution peak at a pore diameter of 20 nm or so. The BET specific surface area was 46.5 $m^2/g$, the mean pore diameter was 18.7 nm, and the pore volume was 0.23 $m^3/g$.

According to the above-mentioned production method, a catalyst material for oxygen gas production of the invention having a controlled mesoporous morphology was obtained.

Example 2

Method for Producing Catalyst Material for Decomposing Carbon Dioxide Gas to Synthesize Acetic Acid, Formaldehyde or Saccharide (Catalyst Material for Carbon Dioxide Decomposition)

<Production of Catalyst Material A Comprising Aggregates of Hydrogenated Manganese Dioxide Nanoparticles>
(Burning)

25 g of a powder of manganese carbonate having a purity of 99.9% (Wako Pure Chemical Industries' special grade reagent) put in a magnetic crucible was burned in an electric furnace at 200° C. for 6 hours to give a burnt manganese carbonate powder.

(Acid Treatment)

50 g of the burnt manganese carbonate powder was suspended in 2 L of dilute hydrochloric acid (0.5 mol/L), stirred for 1 hour, and filtered under suction through a 0.2 micromesh glass fiber filter paper (Advantech's GS25) for solid-liquid separation. The solid substance separated on the glass fiber filer paper was again suspended in 1 L of dilute hydrochloric acid (0.5 mol/L), stirred for 1 hour, and again filtered under suction for solid-liquid separation. Through the operation, the burnt manganese carbonate became a hydrogenated manganese dioxide of a mixture of R-type crystal structure-having manganese dioxide and epsilon-type crystal structure-having manganese dioxide. The hydrogenated manganese dioxide obtained in this stage is a catalyst material A for carbon dioxide gas decomposition that functions as a catalyst for decomposing carbon dioxide gas. When the acid for use in the acid treatment was changed from dilute hydrochloric acid to dilute sulfuric acid or dilute nitric acid, then the same result was obtained.

<Production of Catalyst Material B Comprising Aggregates of Hydrogenated R-Type Manganese Dioxide Nanoneedles>
(Drying Treatment)

The above-mentioned catalyst material A was dried under atmospheric pressure at 100° C. for 12 hours according to the drying treatment 1 in Example 1 mentioned in the above, thereby giving manganese dioxide having mainly an R-type crystal structure. Regarding the morphology of the product to be obtained after drying herein, the circular tabular disc immediately after suction filtration on the glass filter paper after the acid treatment is dried and shrunk to give flakes or blocks having a size on a centimeter order. Accordingly, if desired, they may be ground in an agate mortar to be a powder on a micrometer order.

The obtained substance gave diffraction peaks of R-type manganese dioxide in powder X-ray diffractiometry; and in the substance, the manganese valence was identified as tetravalence in X-ray absorptiometry. From these, the obtained substance was identified as R-type manganese dioxide. The substance was observed with a transmission electromicroscope, which confirmed formation of a lot of powdery aggregates of nanoneedles having a diameter of from 2 to 10 nm and a length of from 5 to 30 nm or so. Further, in surface analysis through nitrogen gas absorptiometry, it was confirmed that the obtained aggregate powder had a mesoporous structure having a mean pore diameter of 11.7 nm or so and a BET specific surface area of 109.3 m²/g. Its pore volume was 0.32 cm³/g.

(Second Acid Treatment)

Further, the flakes or blocks, or the aggregate powder produced by grinding them in an agate mortar was suspended in 1 L of dilute hydrochloric acid (0.5 mol/L), stirred for 1 hour, and filtered under suction through a 0.2 micro-mesh glass fiber filter paper (Advantech's GS25) for solid-liquid separation. The solid substance separated through suction filtration on the glass fiber filer paper is a catalyst material B for carbon dioxide gas decomposition that functions as a catalyst for decomposing carbon dioxide gas. When the acid for use in the acid treatment was changed from dilute hydrochloric acid to dilute sulfuric acid or dilute nitric acid or to trifluoroacetic acid (0.5 mol/L or 1 mol/L) as an organic acid, then the same result was obtained.

Figure 12:
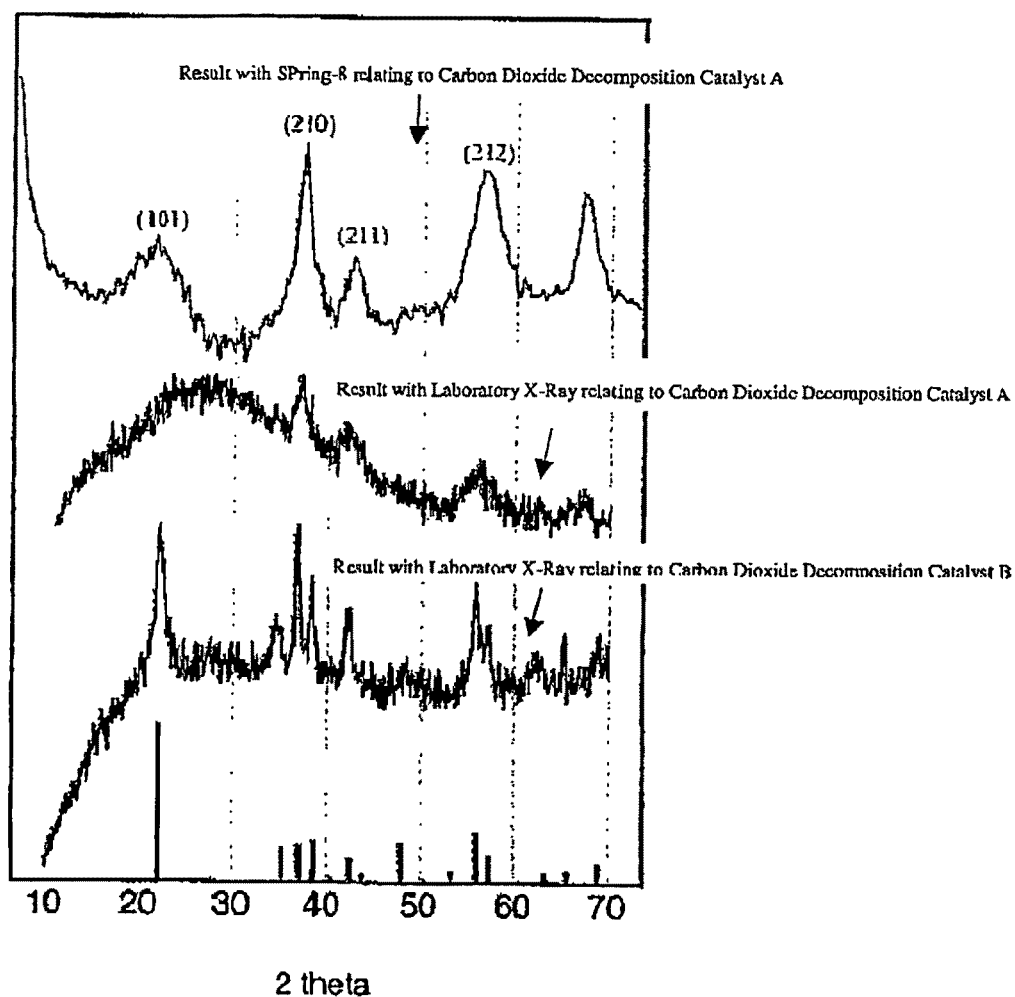
FIG. 12 is an X-ray diffraction pattern of the aggregate powder in Example 2.
Figure 13:
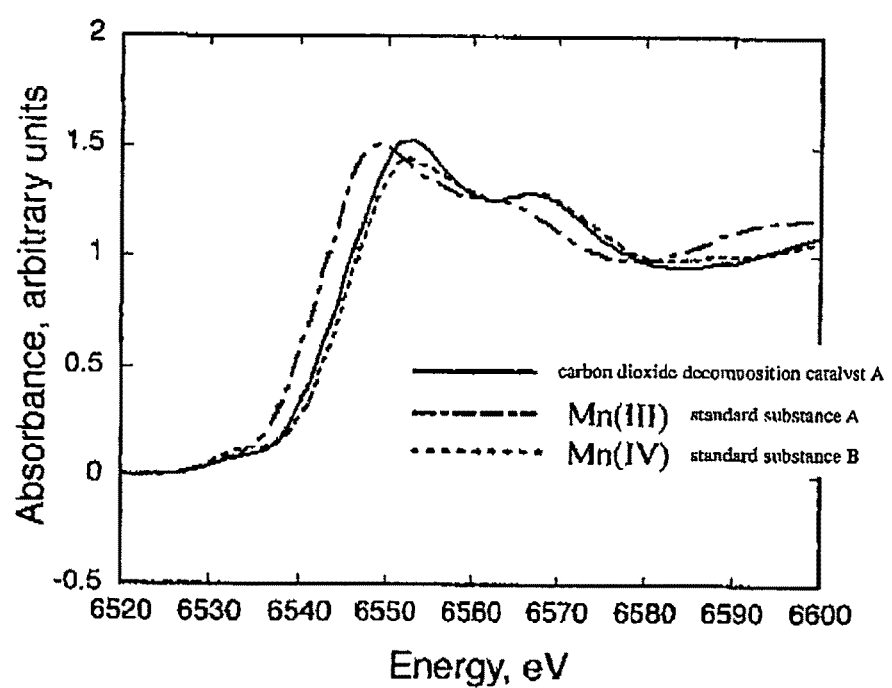
FIG. 13 is an extended X-ray absorption pattern of the aggregate powder in Example 2.

The obtained catalyst material B gave diffraction peaks of R-type manganese dioxide in powder X-ray diffractiometry; and in this, the manganese valence was identified as tetravalence in X-ray absorptiometry. From these, the main ingredient of the catalyst material B was identified as R-type crystal structure-having manganese dioxide. The R-type crystal structure-having manganese dioxide processed for the second acid treatment, differing from the R-type crystal structure-having manganese dioxide before the second acid treatment (that is, the manganese dioxide produced by acid treatment of manganese carbonate at 100° C. for 12 hours followed by acid treatment), has a property peculiar to hydrogenated manganese dioxide of such that it acts for precipitating a palladium ion and a gold ion in water on the surface of the manganese dioxide as the metal, palladium or gold; and therefore, it is confirmed that this is manganese dioxide produced by hydrogenation of the above-mentioned mesoporous structure-having R-type manganese dioxide, thereby having a composition represented by $(H^+, e^-)_x MnO_2$ having a proton $H^+$ and an electron $e^-$ on the surface thereof. FIG. 12 shows a laboratory X-ray diffraction pattern of the catalyst material A comprising the aggregates of nanoparticles of hydrogenated manganese dioxide obtained in the above-mentioned acid treatment, and a laboratory X-ray diffraction pattern of the catalyst material B comprising the aggregates of nanoneedles of hydrogenated R-type manganese dioxide obtained in the above-mentioned second acid treatment; and the last row therein shows the theoretical value of R-type manganese dioxide shown in FIG. 5. Of those, the laboratory X-ray diffraction pattern of the catalyst material A comprising the aggregates of nanoparticles of hydrogenated manganese dioxide is extremely broad, and this was further analyzed in detail through radiation X-ray diffractiometry with SPring-8. As a result, it was found, that the paste of the catalyst material A contains epsilon-type manganese dioxide along with the R-type one, from the diffraction pattern relating to the carbon dioxide decomposition catalyst A shown in the first row in FIG. 12. As opposed to this, the catalyst material B has a crystal structure of R-type manganese dioxide, and contains proton and electron as so mentioned in the above. FIG. 13 shows found data in extended X-ray absorptiometry, in which the standard substance A (manganese oxide of which the manganese valence is plus 3) and the standard substance B (manganese oxide of which the manganese valence is plus 4) are compared with each other, indicating that the valence of the manganese in the paste of the catalyst material A is 4-valent.

Example 3

Method 1 for Producing Oxygen Gas from Water

Figure 14:
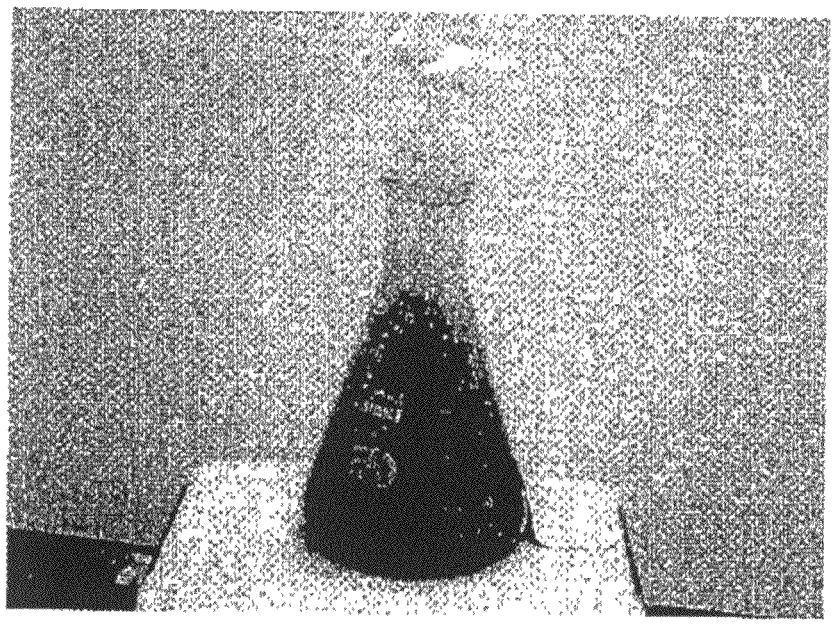
FIG. 14 is a photographic picture showing the experiment for oxygen generation in Example 3.

The catalyst material for producing oxygen gas, obtained in Example 1, was ground in a agate mortar, then 10 g of the powder was transferred into a glass-made Erlenmeyer flask having a volume line at 200 mL, along with one Teflon®-made stirrer thereinto, then 150 mL of dilute hydrochloric acid (0.5 mol/L) was added thereto, and the Erlenmeyer flask was sealed up with a silicone stopper. FIG. 14 shows this. The Erlenmeyer flask was set on a magnetic stirrer, and the dilute hydrochloric acid and the catalyst material therein were stirred for 24 hours. To the silicone stopper used in this experiment, previously fitted was a cock-equipped glass tube for collecting air inside the Erlenmeyer flask through it; and after 24 hours, air inside the flask was collected in a gas-collecting syringe through the glass tube, and then transferred into a Tedlar bag for gas storage. This is a sample for analysis for oxygen concentration. In analyzing the sample for oxygen concentration, the oxygen concentration in the air around the experimental device and the air in the Erlenmeyer flask were determined 6 times and 4 times, respectively, through gas chromatography (Shimadzu GC-14AT), and the found data were averaged. As a result, the sample collected from the Erlenmeyer flask after 24 hours had a higher oxygen concentration of 330 pm, In the reaction system in this experiment, the substance capable of generating oxygen gas is water alone, and therefore, it is verified that the catalyst material of the invention decomposed water to give oxygen.

Example 4

Method 2 for Producing Oxygen Gas from Water

The above Example 3 demonstrated that the catalyst material for producing oxygen gas, obtained in Example 1, functioned as a catalyst capable of decomposing water to generate oxygen gas. In this reaction system, manganese dioxide also contains oxygen in addition to water. In general, an oxide such as manganese dioxide is extremely stable, as compared with metal, and therefore it must be verified that the oxygen gas detected in Example 3 is one produced through decomposition of water. First, a suitable amount of a special-grade reagent, hydrochloric acid, sulfuric acid or trifluoroacetic acid, was added to 1 g of water $H_2^{18}O$ (purity 95 wt. %) comprising an oxygen isotope $^{18}O$, thereby preparing a dilute acid having a concentration of 0.5 mol/L. 0.1 g of the oxygen gas production catalyst material obtained in Example 1 was added to it, and kept stirred with a Teflon®-made magnetic stirrer in a closed vial container having a capacity of 10 mL. In 1 hour, 3 hours and 15 hours after the addition, the gas in the head space in the closed vial was collected with a microsyringe, and the vapor ingredient in the head space was analyzed using a mass spectrometric device with a gas chromatograph directly connected thereto (GCMS) (Shimadzu gas chromatographic mass spectrometry GCMS-QP5050A). As a result, when the aqueous dilute hydrochloric acid was used, generation of isotope oxygen $^{34}O_2$ at a concentration of 12.1 ppmV, and isotope oxygen $^{36}O_2$ at a concentration of 3.65 ppmV was confirmed after 1 hour; and generation of isotope oxygen $^{34}O_2$ at a concentration of 87.45 ppmV, and isotope oxygen $^{36}O_2$ at a concentration of 94.2 ppmV was confirmed after 15 hours. Next, when the aqueous dilute sulfuric acid was used, generation of isotope oxygen $^{34}O_2$ at a concentration of 12.4 ppmV, and isotope oxygen $^{36}O_2$ at a concentration of 3.85 ppmV was confirmed after 3 hours; and generation of isotope oxygen $^{34}O_2$ at a concentration of 41.1 ppmV, and isotope oxygen $^{36}O_2$ at a concentration of 47.75 ppmV was confirmed after 15 hours. When trifluoroacetic acid, the concentration of the isotope oxygen also increased with the lapse of time. Oxygen in manganese dioxide constituting the catalyst material of the invention is almost oxygen $^{16}O$ according to the natural oxygen isotope existence ratio, therefore not containing $^{18}O$. Accordingly, from the fact that the mass of the oxygen gas $O_2$ confirmed in the head space is 34 or 36, it is understood that the isotope water used in the experiment was decomposed to give $^{34}O_2$ as a result of bonding of $^{16}O$ and $^{18}O$ to each other, and $^{36}O_2$ as a result of bonding of $^{18}O$ and $^{18}O$ to each other. Therefore, it was verified that the catalyst material for producing oxygen gas oxidatively decomposed water to give oxygen gas.

Example 5

In the experiment of oxidative decomposition of water in the above Examples 3 and 4, oxygen gas was generated in the reactor put under visible light. This Example is to confirm the presence or absence of generation of oxygen gas in a reactor in the presence or absence of irradiation with visible light, thereby confirming that the catalyst material used in Examples 3 and 4 is a photocatalyst functioning under visible light.

Figure 15:
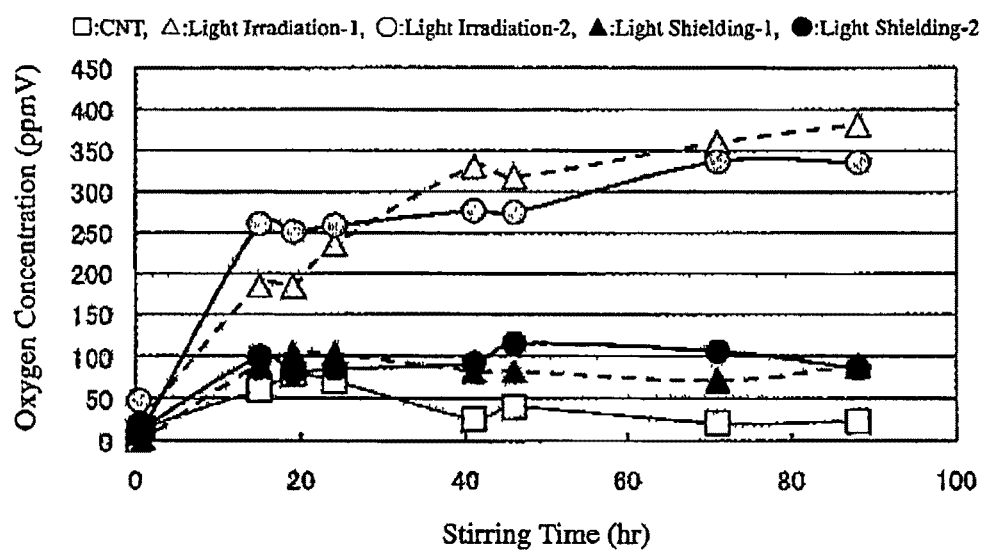
FIG. 15 is a graph showing the change in the oxygen gas generation generated through oxidative decomposition of water under irradiation with a halogen lamp and under shielding from light, in Example 5.

In this experiment, 20 g of the catalyst material obtained according to the method described in Example 1 was ground in a agate mortar, suspended in distilled water at 35° C. filled in a beaker having a capacity of 500 mL, stirred with a magnetic stirrer for 2 hours, collected through filtration, and dried in air at 110° C. for 12 hours. Thus produced, aggregates of nanoneedles of R-type manganese dioxide were used as a catalyst material. In this experiment, for removing as much as possible the oxygen gas from the surface of the catalyst material dried in air, the catalyst material was, after dried in air, put in a reduced-pressure desiccator under −600 cmHg for 12 hours, then argon gas was introduced into the desiccator and restored to atmospheric pressure, and in that condition, the catalyst material was sealed up in a glass container in the argon atmosphere. In a globe box having an argon atmosphere, this was suspended in 50 mL of distilled water which had been previously controlled to have a dissolved oxygen concentration of at most 0.1 mg/L by bubbling in argon gas collected in a glass container having a capacity of 100 mL, and then immediately sealed up with a septum. 0.1 mL of 0.1 M dilute sulfuric acid was previously dropwise added to the distilled water so as to have an acidic pH. Through the above-mentioned operation, the experimental condition was controlled to cancel the possibility that the oxygen gas having generated in the closed glass container might result from the oxygen gas on the surface of the catalyst material dried in air or from the dissolved oxygen originally existing in distilled water. Under the experimental condition, the acidic distilled water with the catalyst material suspended therein in the closed glass container with a magnetic stirrer was put under a fluorescent lamp, and stirred for 48 hours. In this stage, the oxygen concentration in the closed glass container with the catalyst material and the acidic distilled water sealed up therein increased with the lapse of time. On the other hand, the entire surface of the closed glass container was covered up with a black cloth tape wound therearound, and shielded from the light from the fluorescent lamp, and further the closed glass container was covered with a stainless cylinder for light shielding as much as possible. In this case, the oxygen gas concentration in the closed glass container did not almost increase. In case where the light for irradiation is changed from the fluorescent lamp to a halogen lamp or sunlight, the same result was obtained. Accordingly, it is understood that the catalyst material of Example 1 consumes visible light, like plant, to efficiently oxidatively decompose water to generate oxygen gas. FIG. 15 shows the change in the concentration of oxygen gas generated in the closed glass container under irradiation with a halogen lamp and under shielding from light. As in FIG. 15, the oxygen gas concentration in the two closed glass containers under irradiation with a halogen lamp increased with the lapse of time; but the oxygen gas concentration in the two closed glass containers under shielding from light showed with time the same profile as that of the oxygen gas concentration in a closed glass container not containing an aqueous solution of the oxygen gas production catalyst material of Example 1 (in FIG. 15, the data expressed by "CNT (control)), and this means that no oxygen gas was generated under the condition shielded from light.

The condition of the experiment that gave the data in FIG. 15 is mentioned below.

The distance between the closed glass container and the halogen lamp (500 W) was 50 cm. The volume of the closed glass container was 120 mL. The amount of the catalyst material sealed up in the closed glass container was 0.5 g. The amount of water sealed up in the closed glass container was 20 mL. The pH of water sealed up in the closed glass container was 3.2 (controlled by adding sulfuric acid to distilled water). The temperature of water sealed up in the closed glass container was 20.9° C. However, during the experiment, it was confirmed that the temperature of the closed glass container was about 30 to 35° C. owing to the effect of the halogen lamp, by the thermocouple temperature sensor set on the surface of the container. The dissolved oxygen concentration in water sealed up in the closed glass container was 0.1-0.26 (controlled by degassing the dissolved oxygen through bubbling with argon gas). Regarding the light-shielding method, the entire surface of the closed glass container with an aqueous solution of the oxygen gas production catalyst material put therein was covered with a black cloth tape wound therearound, and was further covered entirely with aluminium foil, whereby the container was shielded from the light from halogen lamp.

Example 6

Figure 16:
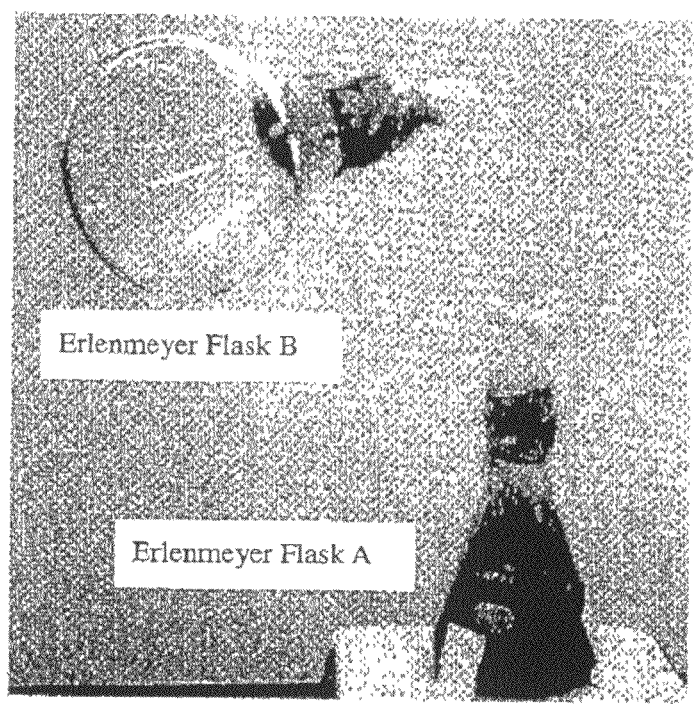
FIG. 16 is a photographic picture showing the experiment for carbon dioxide decomposition in Example 6.

Method for Decomposing Carbon Dioxide Gas to Synthesize Formaldehyde 10 g of the carbon dioxide gas decomposition catalyst B obtained in Example 2 was put into a glass-made Erlenmeyer flask A having a volume line at 300 mL, along with one Teflon®-made stirrer thereinto, then 150 mL of distilled water having a pH of 5.6 was added thereto, thereafter carbon dioxide gas having a purity of 99.9% was fully introduced into the flask A to fill up it, and the Erlenmeyer flask A was sealed up with a silicone stopper. To the silicone stopper used in this experiment, previously fitted was a cock-equipped glass tube for collecting air inside the Erlenmeyer flask A through it; and the Erlenmeyer flask A was so planned that the gas having been generated inside it could be introduced into another sealed Erlenmeyer flask B via a Teflon®-made tube connected to the glass tube when the cock was turned open. FIG. 16 shows this. Previously, 0.4 ml of distilled water was dropwise put in the Erlenmeyer flask B along with the same carbon dioxide gas therein. Therefore, in case where formaldehyde gas, which indicates the decomposition of carbon dioxide gas, is generated in the Erlenmeyer flask A, it may be expected that formaldehyde having high solubility in water could dissolve in 0.4 ml of distilled water in the Erlenmeyer flask B. Using a magnetic stirrer, the distilled water with the catalyst material suspended therein in the flask A was stirred thereby promoting the contact of the catalyst material with carbon dioxide gas, for 24 hours. With the lapse of time, a lot of water drops were observed on the inner surface of the flask A. After 24 hours, a reagent capable of reacting with formaldehyde alone to color was added to the distilled water in the flask B, and heated up to a predetermined temperature. This analytical method is an acetylacetone method, which is a most reliable analytical method for formaldehyde detection (Methods of Analysis in Health Science, Explanatory Notes, by The Pharmaceutical Society of Japan). As a result, there was detected a color reaction peculiar to the liquid with formaldehyde dissolved therein. In addition, it was further confirmed that, when the silicone stopper was removed from the flask, the flask was filled with an irritative odor peculiar to formaldehyde. Further, the sample solution colored in the acetylacetone method was analyzed with a spectrophotometer (Shimadzu UV-3100PC) as to whether the coloration could be at 413 nm, the absorption wavelength characteristic of formaldehyde dissolved in water. As a result, it was confirmed that 0.4 mL of distilled water in the flask B contained formaldehyde. As in the above, it was clarified that formaldehyde not having existed at all in the system of this experiment in the initial stage was formed in the reaction system. Formaldehyde is a substance having a chemical formula $CH_2O$, and it may be considered that the catalyst material of Example 2 of the invention could produce formaldehyde and water according to the following chemical formula:

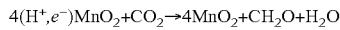

$$4(H^+,e^-)MnO_2+CO_2 \rightarrow 4MnO_2+CH_2O+H_2O$$

In this, $(H^+,e^-)MnO_2$ represents a composition of hydrogenated R-type manganese dioxide. $CO_2$ represents carbon dioxide gas, $CH_2O$ represents formaldehyde, and $H_2O$ represents water.

Also in the same experiment where 20 g of the carbon dioxide gas decomposition catalyst A obtained in example 2 was used, generation of formaldehyde was finally confirmed under the same experimental condition and according to the same process.

Example 7

Method 1 for Collecting Electricity by Oxidative Decomposition of Water

A platinum mesh (300 mesh) having a size of 7 mm square was stuck to the upper surface and the lower surface of a flake (thickness 3 mm, width 10 mm, length 12 mm) of a catalyst material of mainly R-type manganese dioxide obtained in Example 1. The platinum mesh on the upper surface of the flake acts as a minus electrode and the platinum mesh on the lower surface of the flake acts as a plus electrode. On the upper surface of the flake, formed was a space separated from air by the use of Parafilm (by PECHINEY PLASTIC PACKAGING, MENASHA, WI 54952); and hydrogen gas wetted by leading it to pass through distilled water with a baffler (purity 99.9%, by GL Science, 0.8 MPa) was jetted into the space. On the other hand, the platinum mesh on the lower surface of the flake was kept open to air, and thus a system not contacted with hydrogen gas was formed. The jetting introduction of the wetted hydrogen gas into the space on the upper surface of the flake was repeated a few times, whereupon generation of a plus potential between the above-mentioned minus electrode and the plus, electrode was confirmed. The potential between the two electrodes suddenly increased just after jetting introduction of the wetted hydrogen gas to the minus electrode on the upper surface of the flake, from the initial level before the jetting application, minus 0.01 mV to plus 0.01 mV, to plus 1 to 12 mV, and thereafter immediately lowered to plus 0.1 mV or so. Obviously, the potential generation was synchronized with the timing of the jetting application of the moisture-containing hydrogen gas, and this verifies the generation of electric energy through water decomposition at the minus electrode on the upper surface of the flake. In this connection, after repeated jetting application of the moisture-containing hydrogen gas a few times, a potential could be generated between the two electrodes by introducing air in through the same bubbler after it; and from this, the role of the hydrogen gas in this reaction system may be considered as follows: When contacted with the platinum mesh, hydrogen gas changes into hydrogen ion owing to the catalytic effect of the platinum, and therefore dissolves in the moisture on the surface of the manganese dioxide of the invention on the side of the minus electrode, whereby the moisture becomes acidic. Accordingly, like in Example 3, the manganese dioxide is put in acidic water and may oxidatively decompose water with generating oxygen gas. In other words, the hydrogen ion (proton) supplied from hydrogen gas or water dissolves in water on the minus electrode side, and the electron is trapped by the platinum mesh and is taken out to the external circuit connected to a voltmeter. Accordingly, it was thus verified that, in this Example, from the oxidative decomposition of water by the use of the oxygen gas production catalyst of Example 1 of the invention, not only oxygen gas but also electric energy was obtained.

In an experiment where a beta-type manganese dioxide flake was used in place of the R-type manganese dioxide flake used in this Example, no voltage was generated in the same experimental process. Accordingly, it is understood that for oxidative decomposition of water, manganese dioxide having an R-type crystal structure is effective.

Example 8

Method 2 for Collecting Electricity by Oxidative Decomposition of Water

Figure 17:
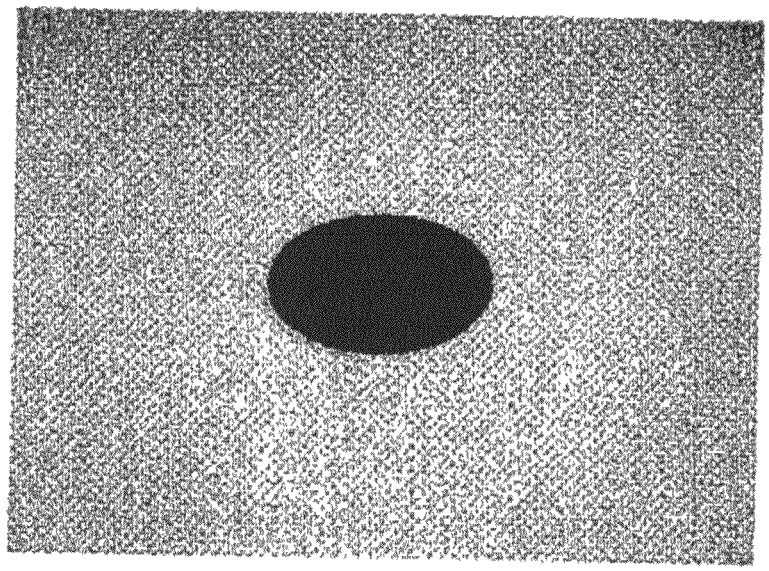
FIG. 17 is a photographic picture showing the pellet of aggregates of R-type manganese dioxide used in Example 8.
Figure 18:
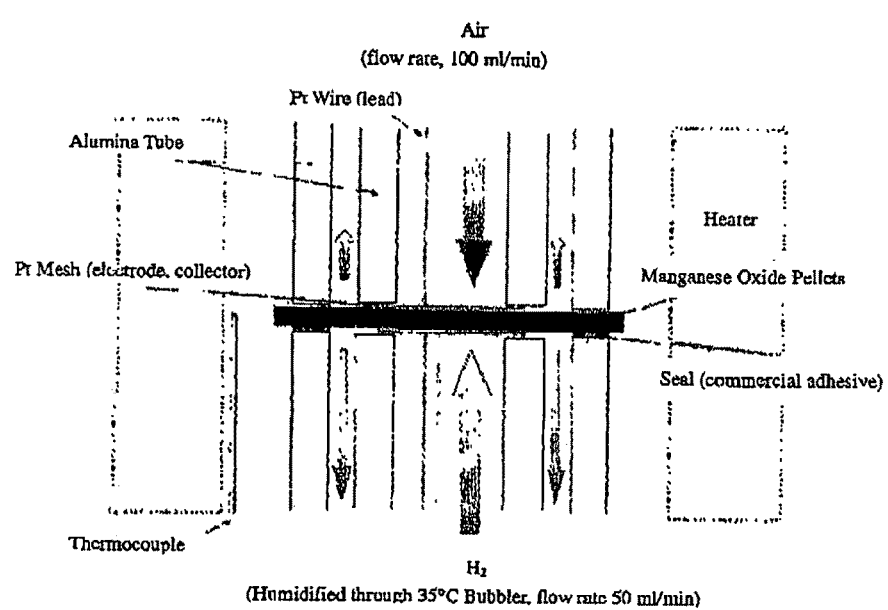
FIG. 18 is a view showing a system for measuring the voltage generated through oxidative decomposition of water in Example 8.

This experiment is to further increase the experimental accuracy in Example 7. In this experiment, the R-type manganese dioxide obtained in Example 1 was well ground in an agate mortar, and pelletized into a coil-shaped pellet (FIG. 17) having a diameter of 20 mm and a thickness of 1 mm under a power of 10 tons applied thereto, using a pelletizer. Two drops of 0.5 M dilute hydrochloric acid were give to the pellet, then dried at 150° C. for 12 hours to enhance the strength of the pellet. The pellet was set in a system shown in FIG. 18, air and hydrogen gas wetted with a bubbler were fed into it, as in FIG. 18, whereupon the potential difference between the platinum meshes (100 mesh) disposed on the upper and lower surfaces of the pellet was determined. As a result, immediately after the gas supply, a potential difference of +10 mV was stably metered, and when the gas supply was stopped, the potential difference immediately became 0 mV. It may be considered that since R-type manganese dioxide flake used in the above-mentioned Example 7 was smaller than that in the present Example 8 and therefore since the contact area of the pellet with gas was smaller in the former, the potential difference in Example 7 would be more unstable and smaller than in the present Example. Accordingly, from the result in the present Example, it is understood that when the contact area with wetted gas is large, then a stable high potential difference can be produced by oxidative decomposition of water.

Example 9

Method 3 for Collecting Electricity by Oxidative Decomposition of Water

This experiment is to further increase the experimental accuracy in Example 8. In Example 8, air was supplied to one surface of the R-type manganese dioxide pellet and hydrogen gas wetted through a bubbler filled with distilled water was supplied to the other surface thereof. In this case, the hydrogen ion to hydrogenate the R-type manganese dioxide is the hydrogen ion generated by decomposing the supplied hydrogen gas kept in contact with the platinum mesh. However, the hydrogen gas decomposition reaction produced also electron along with hydrogen ion through contact with the platinum mesh. Accordingly, the hydrogen gas-derived electron and the electron derived from water molecule through oxidative decomposition of water are mixed, and as a result, the potential difference generated between the two surfaces of the pellet is not only the potential difference caused by the electron from the oxidative decomposition of water but also the total of that potential difference plus the other potential difference generated by the electron from decomposition of hydrogen gas. Accordingly, in the experiment of this Example, air wetted with 0.5 M dilute hydrochloric acid filled in a bubbler was supplied onto one surface of the pellet, in place of hydrogen gas, and dry air as in Example 8 was supplied onto the other surface thereof for collecting electricity. In this connection, the hydrochloric acid molecule HCl in dilute hydrochloric acid is decomposed into $H^+$ and $Cl^-$, not producing electron; and therefore the potential difference only by the oxidative decomposition of water can be detected.

Figure 19:
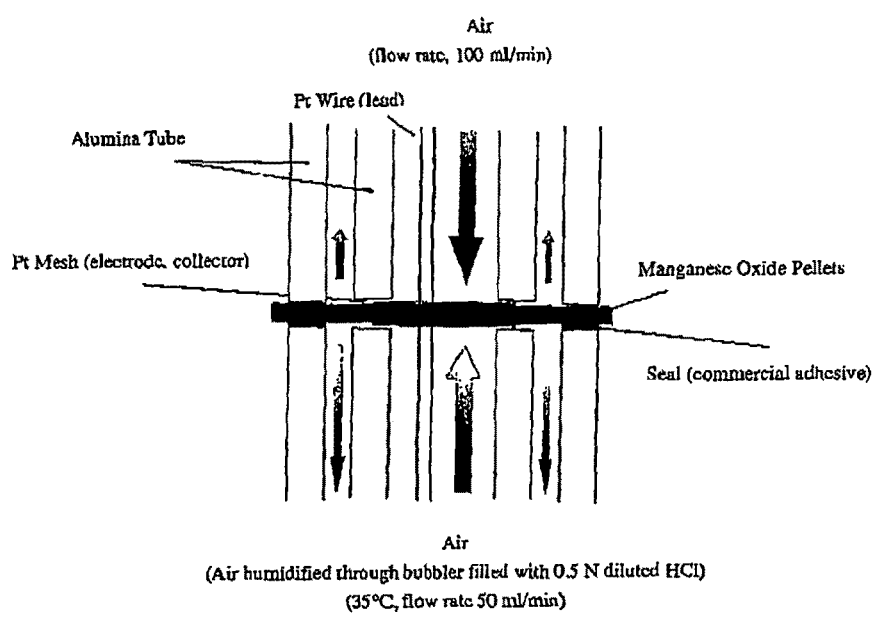
FIG. 19 is a view showing a system for measuring the voltage generated through oxidative decomposition of water, in Example 9.

In this experiment, the R-type manganese dioxide obtained in Example 1 was well ground in an agate mortar, then pelletized into a coin-shaped pellet having a diameter of 20 mm and a thickness of 1 mm under a pressure of 15 tons applied thereto for 10 minutes, using a pelletizer. The pellet was sandwiched between two slide glass sheets suitably wetted with 0.5 M dilute hydrochloric acid, and heated in air at 150° C. for 12 hours, thereby increasing the strength of the pellet not deforming the shape of the pellet. The pellet was set in a system shown in FIG. 19, air, and dry air that had been wetted by leading it to pass through a bubbler filled with 0.5 M hydrochloric acid were fed into it, as in FIG. 19, whereupon the potential difference between the platinum meshes (100 mesh) disposed on the upper and lower surfaces of the pellet was determined. As a result, gradually after the start of the supply of the air wetted with dilute hydrochloric acid, the potential difference gradually increased, and after 80 minutes, the potential difference of +0.632 mV was stably detected. After the supply of the dilute hydrochloric acid-wetted air was stopped, dry air not wetted with dilute hydrochloric acid was supplied in place of it to dry the surface of the pellet wetted with dilute hydrochloric acid, whereupon the potential difference came to gradually lower from +0.632 mV to reach 0 mV after 20 minutes. The maximum value of the potential difference obtained in this Example is smaller than that in the above-mentioned Example 8, and the reason may be considered because the potential difference obtained in Example 8 included the potential difference by the hydrogen gas-derived electron, as so mentioned in the above. Accordingly, from the result in this Example 9, it has been confirmed more accurately that the hydrogenation of R-type manganese dioxide by the hydrogen ion in dilute hydrochloric acid resulted in oxidative decomposition of water.

Between the case where hydrogen gas was fed to the R-type manganese dioxide pellet as in the above-mentioned Examples 7 and 8, and the case where hydrogen gas-free air and water were fed to the R-type manganese dioxide pellet as in the present Example 9, the potential difference generation responsiveness after the feeding was compared. In Examples 7 and 8, when hydrogen gas was fed to the R-type manganese dioxide pellet, the potential difference was immediately detected, and when the supply was stopped, the potential difference immediately lowered to 0 mV; however in Example 9 in which no hydrogen gas was fed, the potential difference gradually increased after the feeding, and even after the feeding was stopped, the potential difference did not immediately lower to 0 mV but gradually lowered, and the responsiveness and the resulting potential difference value are obviously lower than those in the case of Examples 7 and 8 where hydrogen gas was introduced. This indicates that the system of Example 8 shown in FIG. 18 functions as a hydrogen gas sensor. Accordingly, it is verified that, like in FIG. 18 and FIG. 19, an R-type manganese dioxide pellet is sandwiched between platinum mesh electrodes, then hydrogen gas-containing air is introduced onto the one surface of the pellet while air is introduced onto the other surface, and the potential difference generated between the platinum meshes is measured, whereby the presence of hydrogen gas in air can be confirmed.

Example 10

Application to Electrolyte for Solid Oxide-Type Fuel Cell

Figure 20:
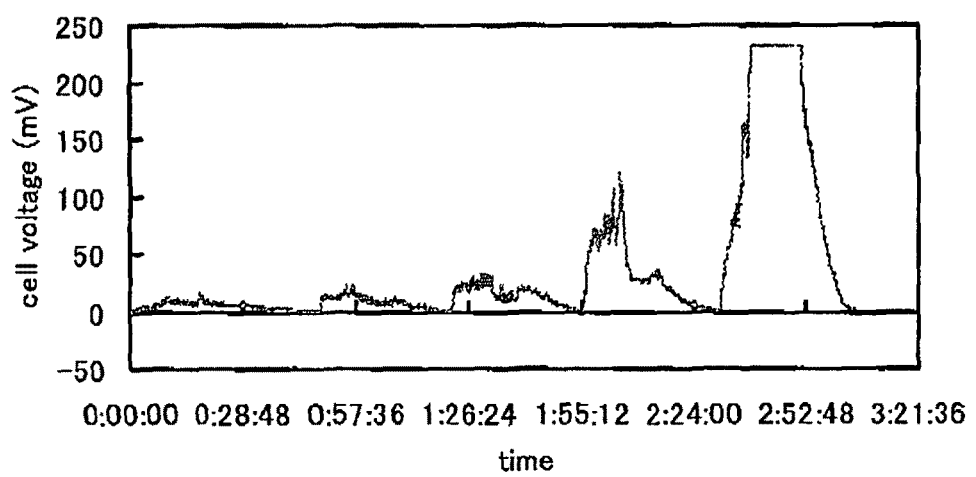
FIG. 20 shows the found data of electromotive force in Example 10.

In this experiment, 20 g of a catalyst material obtained according to the method described in Example 1 was ground in a agate mortar, suspended in distilled water at 40° C. filled in a beaker having a capacity of 500 mL, stirred for 2 hours with a magnetic stirrer, then collected through filtration, and dried in air at 110° C. for 12 hours, thereby removing an impurity, manganese chloride from the surfaces of the R-type manganese dioxide nanoneedle aggregates. 0.6 g of the catalyst material powder thus processed was pelletized into a coin-shaped pellet having a diameter of 20 mm and a thickness of 0.7 mm under a pressure of 640 kgf/cm2 applied thereto for 10 minutes, using a pelletizer. The pellet was set in a system like in FIG. 18, dry air at 35° C. and hydrogen gas wetted with dilute hydrochloric acid through a bubbler filled with 0.5 M hydrochloric acid at 35° C. were fed to each surface of the pellet, under the same condition as in FIG. 18. Then, the electromotive force generated between the platinum meshes (100 mesh) disposed on the upper and lower surfaces of the pellet at room temperature was measured. As a result, as shown in the upper and lower graphs in FIG. 20, with repeated feeding and stopping of hydrogen gas, the electromotive force increased, and finally, the electromotive force of more than +0.6 V was metered. In consideration of the fact that the theoretical electromotive force in a case where hydrogen gas is used as fuel is about +1.1 V, it is understood that the maximum electromotive force of +0.6 V obtained in this experiment reaches about 50% of the theoretical value. Such a high electromotive force obtained herein indicates that the pellet functions as an proton-conductive electrolyte, and it has been verified that use of an electrolyte of mainly R-type manganese dioxide realizes a fuel cell capable of acting at room temperature.

Example 11

Figure 21:
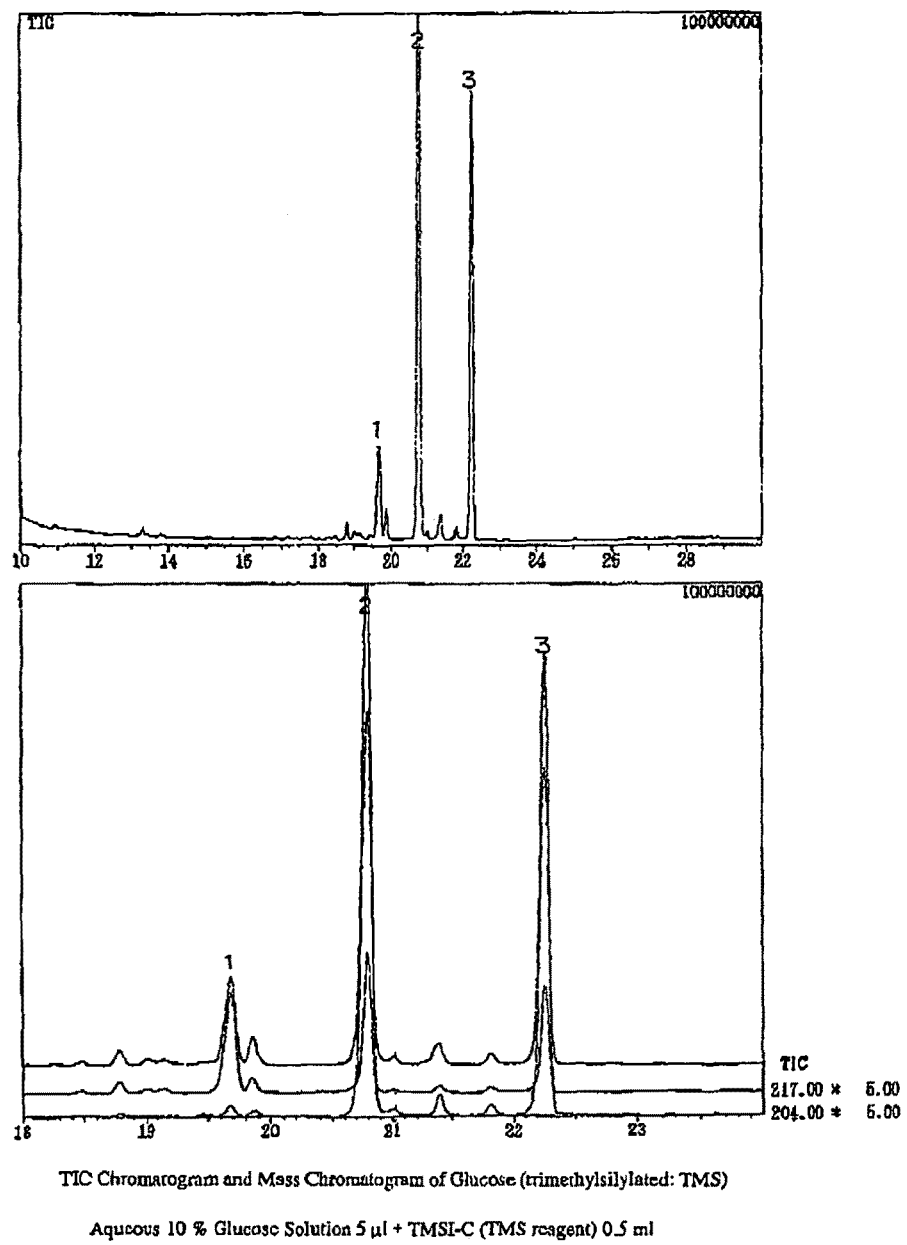
FIG. 21 shows the found data in gas chromatographic mass spectrometry of glucose standard solution for glucose detection in Example 11.
Figure 22:
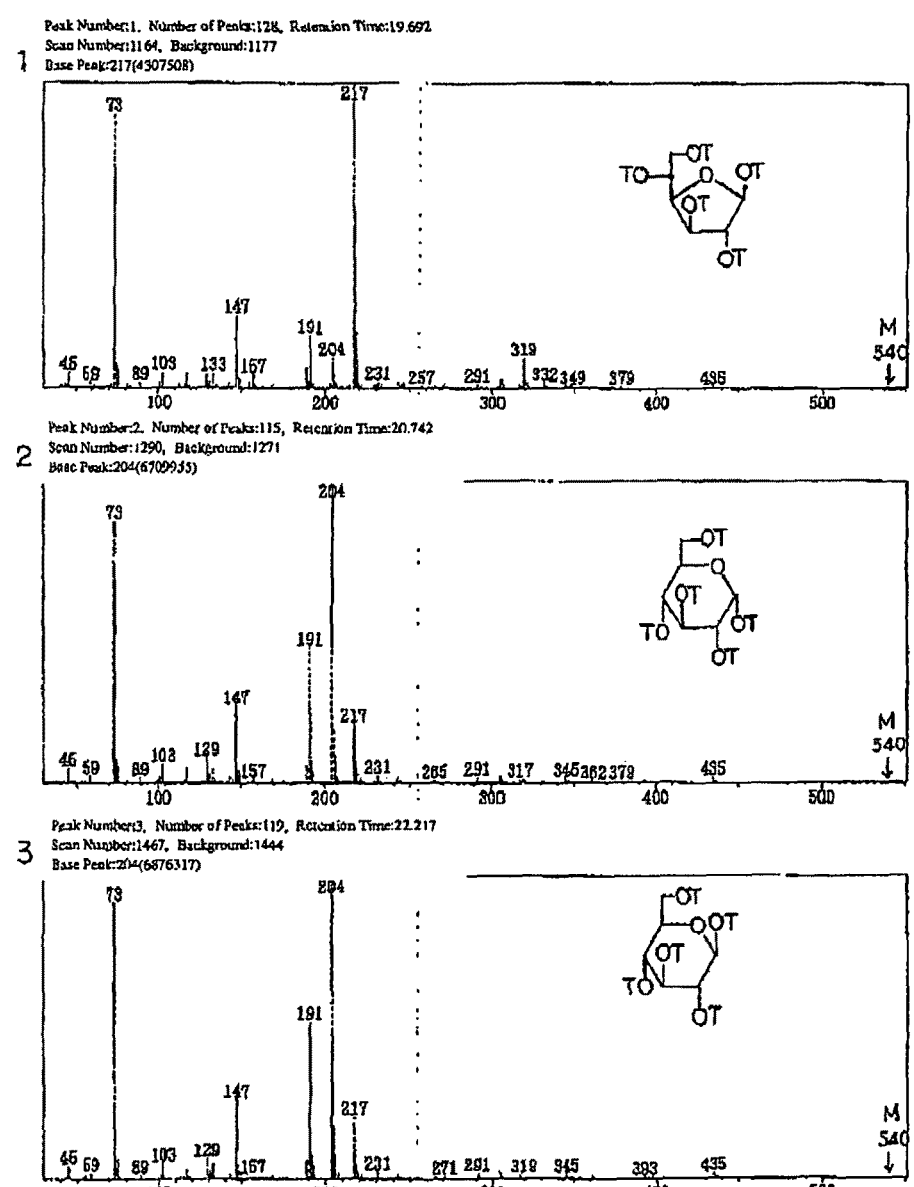
FIG. 22 shows the mass spectrum of trimethylsilylated glucose.
Figure 23:
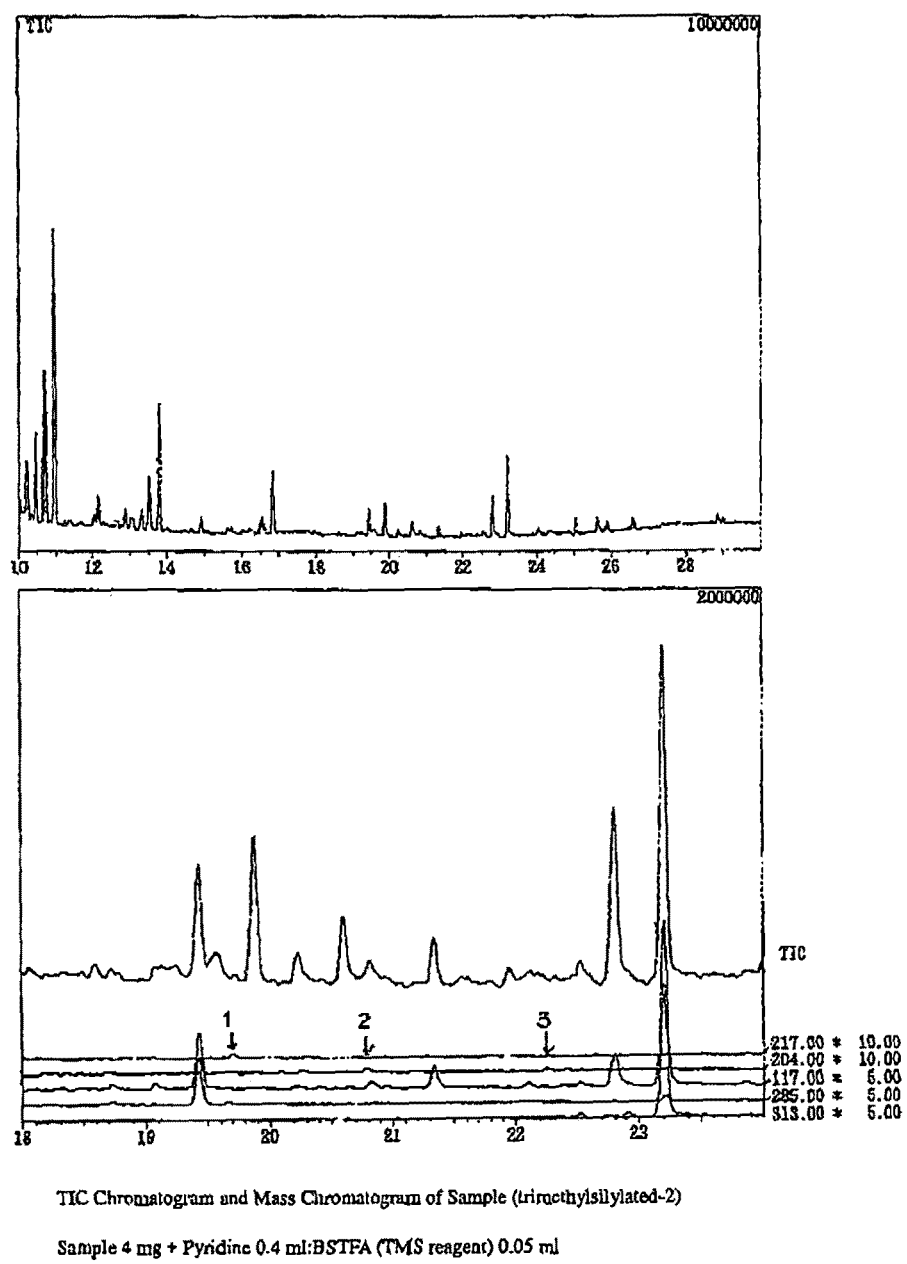
FIG. 23 shows the found data in analysis of white powder dissolved in pyridine and trimethylsilylated in Example 11.
Figure 24:
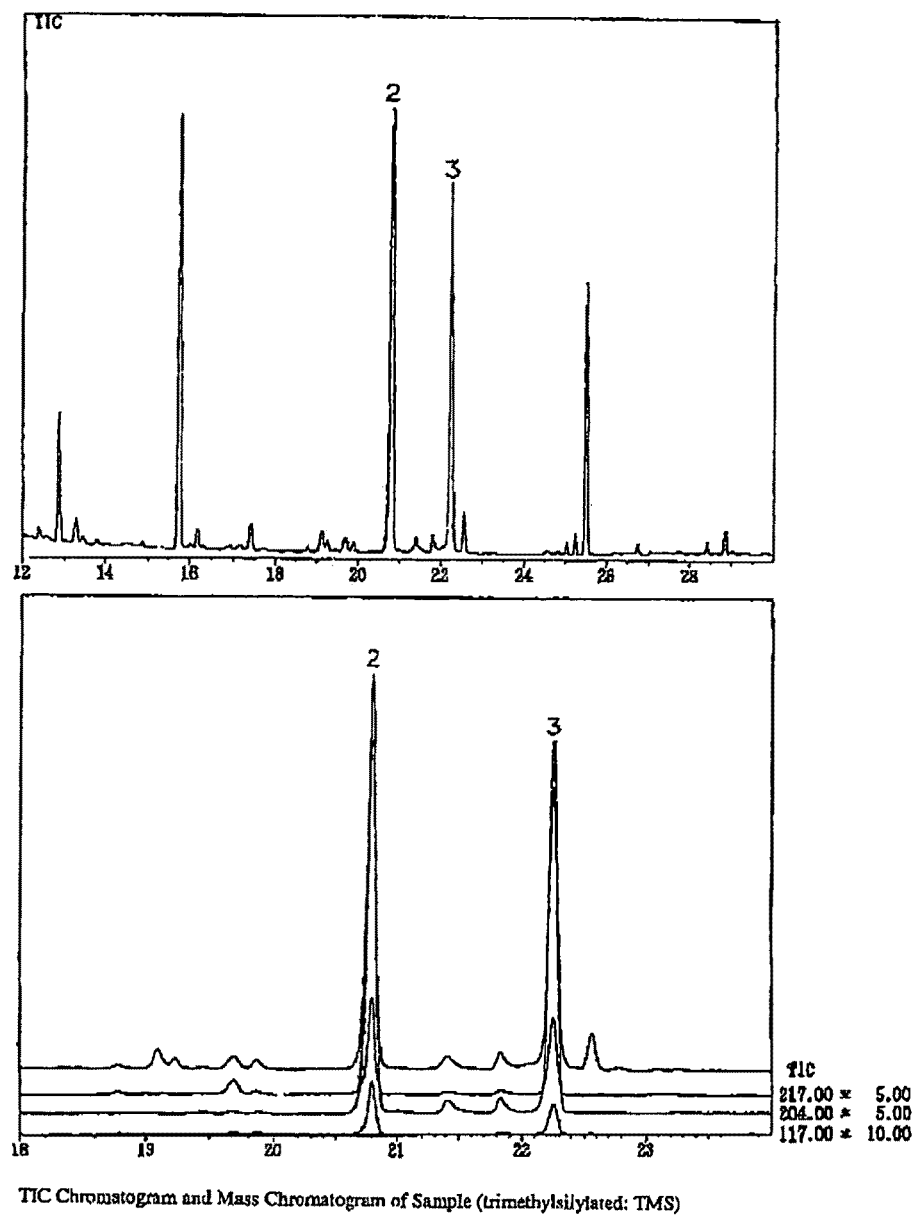
FIG. 24 shows the found data in analysis of white powder dissolved in pyridine, dropwise added with sulfuric acid, dewatered and trimethylsilylated in Example 11.

Method for Synthesizing Saccharide by the Use of Catalyst Material Comprising Aggregates of Hydrogenated Manganese Dioxide Nanoparticles The catalyst material A comprising aggregates of hydrogenated manganese dioxide nanoparticles shown in Example 2 was, while wetted with dilute hydrochloric acid, transferred onto a glass-made laboratory dish, and covered with an aluminium foil cover with a large number of holes formed therein, and this was dried in a forced countercurrent-type drier (Tokyo Rika Kiki's low-temperature air drier, WFO-451SD) at 120° C. for 12 hours. While the catalyst material A was being dried during the drying treatment, it was seen that a transparent liquid of mainly manganese chloride bled out from the catalyst material A to be released around the catalyst material A. The transparent liquid was, at the end of the drying treatment, solidified as a white powder. The main ingredient of the white powder was manganese chloride, but was checked as to it could contain saccharides such as glucose through mass spectrometry directly connected with gas chromatograph (GCMS method). The result of the analysis is described below. FIG. 21 shows analytical data of 5 μl of an aqueous 10% solution of standard glucose that had been well dewatered and trimethylsilylated at the 5 hydroxyl groups of glucose to thereby increase the evaporability thereof, through GCMS (Shimadzu gas chromatographic mass spectrometer GCMS-QP5050A). The peak numbers 1, 2 and 3 indicate glucose having the structure shown in the mass spectrum hi FIG. 22. T in the structural formula means that H of the original —OH group is substituted with trimethylsilyl, $(CH_3)_3Si$. FIG. 23 shows the found data in analysis of 4 mg of the white powder sample dissolved in 0.4 ml of pyridine followed by trimethylsilylation, in which only a trace of glucose was detected as contained in the white powder sample. FIG. 24 shows the found data in analysis of 5 mg of the white powder sample dissolved in 0.5 ml of distilled water, to which 10% sulfuric acid was dropwise added, then 50 μl of the solution was dewatered and then trimethylsilylated. Peaks 2 and 3 were greatly detected, but peak 1 was not detected. This agrees with the conventional general knowledge relating to glucose that the presence of furanose-type glucose for the peak 1 in water is less than 1%. In this connection, the peak 2 is for α-pyranose-type glucose, and the peak 3 is for β-pyranose-type glucose. In general, it is said that, in the equilibrium state in water, the ratio of α-pyranose-type glucose accounts for 38% and the ratio of β-pyranose-type glucose accounts for 62%. However, regarding the ratio of α-pyranose-type glucose and β-pyranose-type glucose in the aqueous solution obtained from the white powder sample in this experiment, the intensity of the peak 2 indicating the amount of α-pyranose-type glucose is higher than that of the peak 3 indicating the amount of β-pyranose-type glucose, as is obvious from FIG. 24; and as compared with the ratio of the two glucoses in an ordinary aqueous solution described hereinabove, the α-pyranose-type glucose is rich in the sample of this experiment. It may be anticipated that the glucose composition ratio would be peculiar to the glucose artificially synthesized from the catalytic material comprising aggregates of hydrogenated manganese dioxide nanoparticles. In this experiment, the sample was hydrolyzed with sulfuric acid and, as a result, glucose was strongly detected. From this, it may be considered that glucose bonding to a substance having a larger molecular weight could be contained in the white powder. When the larger substance is a biose such as sucrose or the like, then it may be detected directly as it is in the same method, and therefore, it may be considered that in the sample in this experiment, glucose would bond to a substance having a higher molecular weight than biose. Accordingly, before the sample was hydrolyzed with sulfuric acid, an iodine solution was added to the sample. The iodine solution was prepared by dissolving 0.1 g of iodine in a solution prepared by dissolving 0.1 g of potassium iodide in 20 ml of water, followed by adding water thereto to make 300 ml in total. The color of the solution of the sample to which the iodine solution was added changed from the color of the iodine solution to ultra-pale violet. This is color change characteristic of iodine-starch reaction. Accordingly, it was anticipated that the sample would contain starch. In this connection, it is well known that, when starch is hydrolyzed with sulfuric acid, it gives glucose. In other words, in drying treatment of the catalyst material comprising aggregates of hydrogenated manganese dioxide nanoparticles, it has been confirmed that, when the catalyst material is contacted with air ingredients such as carbon dioxide in air, then not only formaldehyde $CH_2O$ but also starch having a higher molecular weight is formed. In this connection, it is generally known that formaldehyde $CH_2O$ is an organic substance existing at the end of the chain constituting all polysaccharides, and when a compound comprising carbon and oxygen is chain-like, bonded to it, then glucose $C_6H_{12}O_6$ and starch can be formed. Starch is a carbohydrate (polysaccharide) having a molecular formula $(C_6H_{10}O_5)_n$, and is a natural polymer of a large number of α-glucose molecules polymerized through glycoside bonding. Glucose is one of typical monoses, and may be called grape sugar. This is one of substances that produce energy for activity of animals such as typically humans and plants, and is known as only one energy source in brain.

Example 12

Method 1 for Recycling Waste Liquid, Method for Synthesizing R-Type Manganese Dioxide The liquid phase part separated in solid-liquid separation in the acid treatment in Example 1 was used as the waste liquid. The waste liquid is an aqueous solution having a weak acid pH, containing high concentration of manganese ion. It is obvious that, in case where the acid used in the acid treatment in Example 1 is dilute hydrochloric acid, the manganese ion in the waste liquid resulted from manganese chloride $MnCl_2$ dissolved in water therefore forming manganese ion, but in case where dilute sulfuric acid is used in the acid treatment, the manganese ion resulted from manganese sulfate $MnSO_4$ dissolved in water therefore forming manganese ion. The manganese ion concentration in the solution was determined through ICP emission spectrometry, and it was confirmed that the manganese ion concentration in the aqueous solution was nearly 10000 ppm.

10 ml of aqueous 30% hydrogen peroxide $H_2O_2$ solution (by Wako Pure Chemical Industries) was added to 500 ml of the waste liquid, stirred with a magnetic stirrer for 5 minutes, and then 3.5 ml of aqueous sodium hydroxide NaOH solution having a concentration of 1 mol/L was added thereto, and kept stirred for 10 minutes. When the aqueous sodium hydroxide solution was added, then black manganese dioxide precipitate was precipitated immediately. In this case, the order of adding hydrogen peroxide and aqueous sodium hydroxide solution to the waste liquid may be reversed. The aqueous solution thus having a precipitate formed therein was kept stirred for 20 minutes, and then filtered through a glass filter paper (Advantech's GS-25) under reduced pressure, whereby a black manganese oxide precipitate collected on the filter paper, and after thus collected, this was, while still wet, suspended in 500 ml of dilute hydrochloric acid (or dilute sulfuric acid) having a concentration of 0.5 mol/L, and kept stirred with a magnetic stirrer for 1 hour. After thus kept stirred, this was again filtered under reduced pressure through a glass filter paper (Advantech's GS-25), and the acid-treated black manganese oxide precipitate on the filter paper was collected. The acid-treated black manganese oxide precipitate was transferred onto a glass-made laboratory dish, and then dried in the manner mentioned below.

Drying Treatment: Synthesis of R-Type Manganese Dioxide Needles Having a Diameter of from 2 to 10 nm and a Length of from 5 to 30 nm The wet pasty manganese dioxide obtained after the acid treatment was transferred onto a glass-made laboratory dish, and dried in a forced countercurrent drier under atmospheric pressure at 120° C. for 12 hours. Regarding the morphology of the manganese dioxide obtained after drying herein, the circular tabular disc immediately after suction filtration on the glass filter paper after the acid treatment is dried and shrunk to give flakes or blocks having a size on a centimeter order. Accordingly, if desired, they may be ground in an agate mortar to be a powder on a micrometer order.

Figure 25:
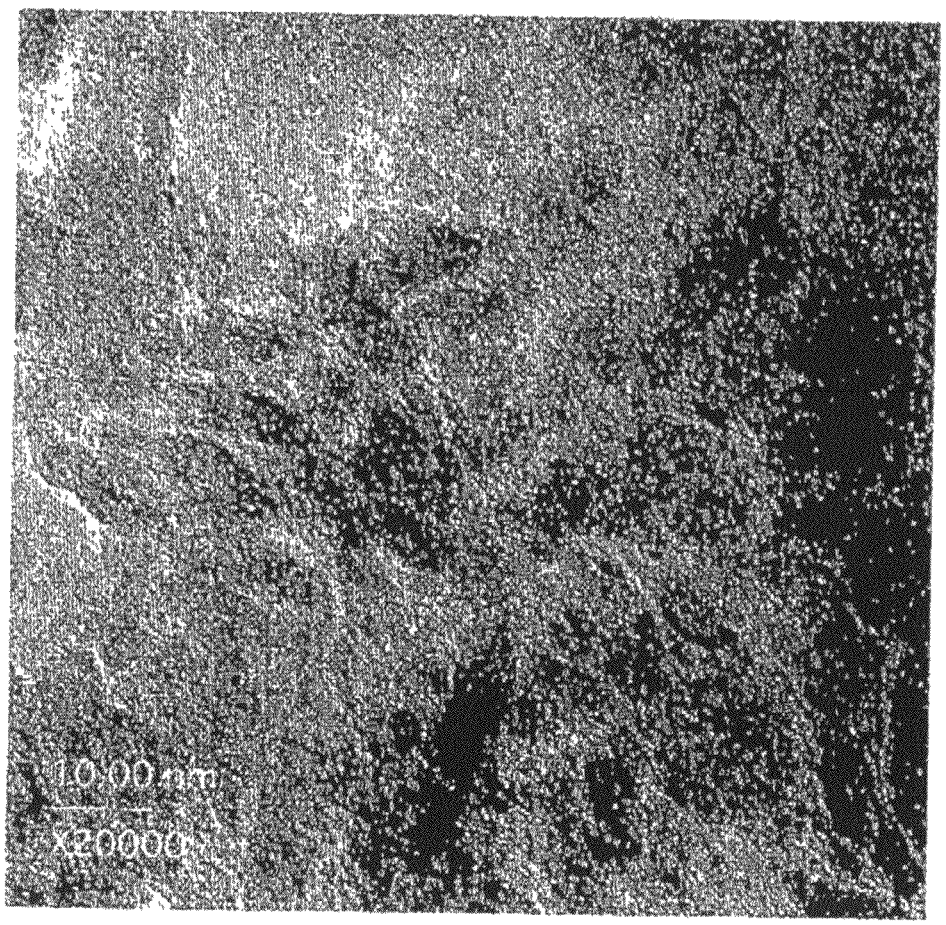
FIG. 25 is a transmission electromicroscopic picture of the aggregate powder obtained in Example 12.
Figure 26:
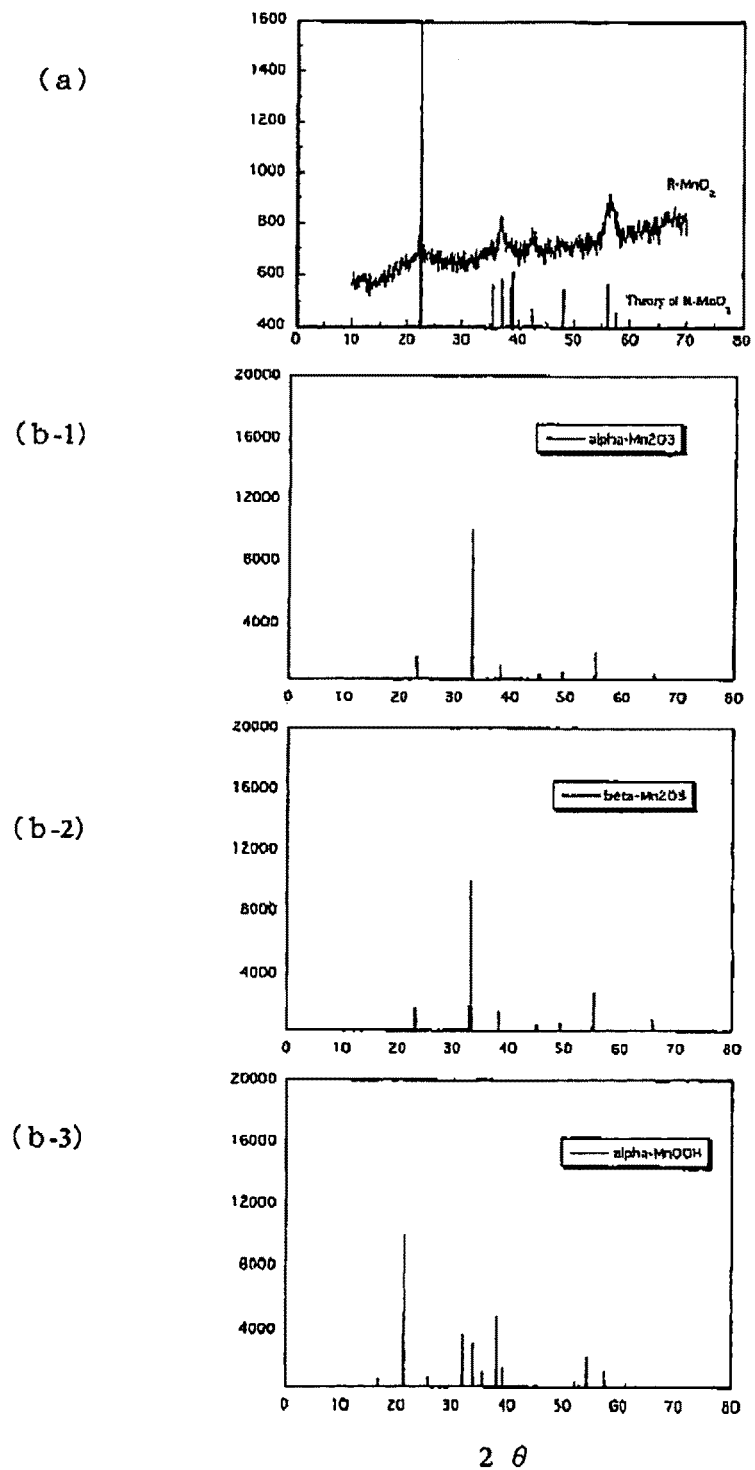
FIG. 26 is an X-ray diffraction pattern of the aggregate powder in Example 12.

The obtained manganese dioxide gave diffraction peaks of R-type manganese dioxide in powder X-ray diffractiometry; and in this, the manganese valence was identified as tetravalence in X-ray absorptiometry. From these, the obtained substance was identified as R-type manganese dioxide. The substance was observed with a transmission electromicroscope, which confirmed formation of a lot of powdery aggregates of nanoneedles having a diameter of 3 nm and a length of 5 nm or so (see FIG. 25). The upper graph in FIG. 26($a$) shows a laboratory X-ray diffraction pattern indicating that the obtained aggregate powder is R-type manganese dioxide. The lower graph in FIG. 26($a$) shows theoretical data from a reference (Fong, C., Kennedy, B. J., Elcoinbe, M. M.; Zeitschrift Fuer Kristallographie, 1994, 209, 941) indicating the position of the diffraction angle at which theoretical diffraction peaks of R-type manganese dioxide appear. FIG. 26($b$-1) to FIG. 26($b$-3) show X-ray diffraction patterns of +3-valent manganese oxides, alpha-$Mn_2O_3$, beta-$Mn_2O_3$ and alpha-MnOOH. The diffraction pattern of the aggregate powder obtained herein, in FIG. 26($a$), differs from the X-ray diffraction patterns of +3-valent manganese oxides in FIG. 26($b$-1) to FIG. 26($b$-3), and therefore, it has been confirmed that the manganese oxide synthesized in this Example does not contain those +3-valent manganese oxides.

According to the above-mentioned production method, nano-scale R-type manganese dioxide was obtained, starting from an aqueous solution containing +2-valent manganese ion.

In this Example, produced was R-type manganese dioxide needles having a diameter of from 2 to 10 mm and a length of from 5 to 30 nm; however, by controlling the drying condition as in Example 1, R-type manganese needles having a predetermined size can be obtained. Further, the R-type manganese dioxide can be used as a catalyst material for producing oxygen gas from water.

In this Example, when the acid-treated manganese oxide precipitate was collected through filtration and then dried in air, it gave an irritative odor peculiar to formaldehyde. Acid treatment of manganese dioxide gives hydrogenated manganese oxide $(H^+,e^-)_xMnO_2$, and it may be presumed that, since carbon dioxide exists in air, the carbon dioxide would be contacted with the hydrogenated manganese oxide to give formaldehyde. Accordingly, it has been confirmed that the manganese dioxide can also be used as a catalyst material for synthesizing formaldehyde from carbon dioxide, or that is, as the carbon dioxide decomposition catalyst A described in Example 2.

In addition, it has been confirmed that even when the waste liquid formed in the acid treatment in Example 2 is used, R-type manganese dioxide can be produced.

In this Example, used was the waste liquid in acid treatment in Example 1. Not limited to it, however, any other aqueous solution containing a divalent manganese ion, prepared by dissolving a +2-valent manganese salt such as manganese chloride, manganese oxalate, manganese nitrate or the like in a dilute acid or the like, can also be used, and it has been confirmed that adding hydrogen peroxide and an alkali reagent thereto gives R-type manganese dioxide. In this case, the manganese ion concentration remaining in the final waste can be reduced to at most 10 to 100 ppm.

Example 13

Method 2 for Recycling Waste Liquid

Figure 27:
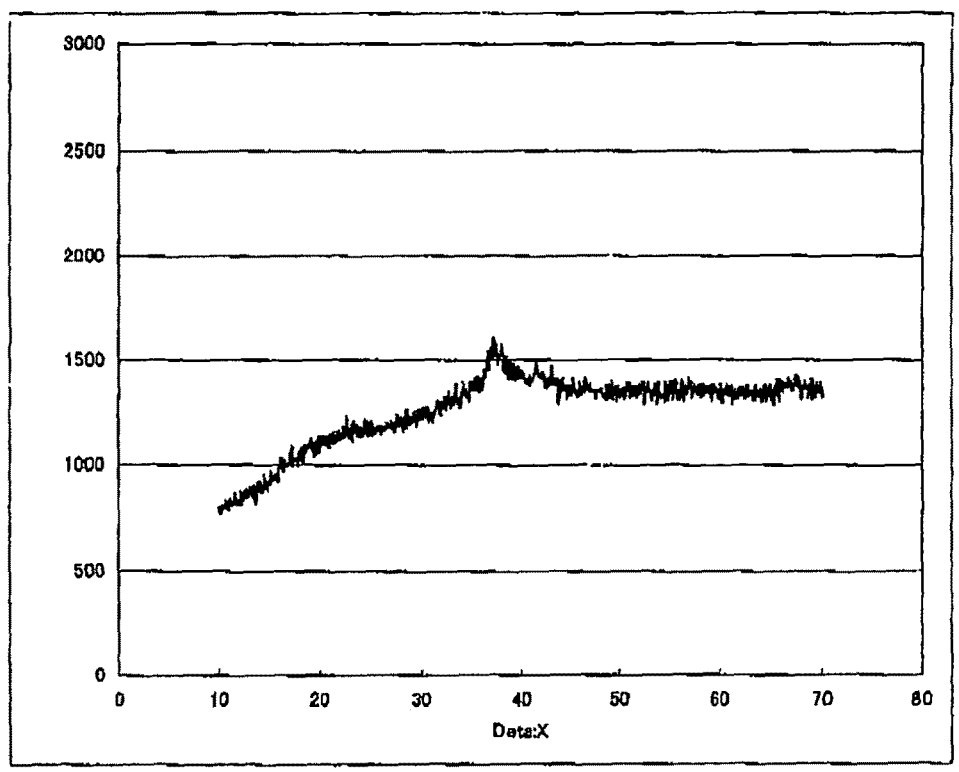
FIG. 27 is an X-ray diffraction pattern of the aggregate powder in Example 12.

The 500 ml of the waste liquid generated in the acid treatment in Example 1, added was a +7-valent manganese salt, potassium permanganate powder (by Wako Pure Chemical Industries) in such that the +7-valent manganese amount could be a nearly equimolar amount relative to the +2-valent manganese ion amount in the aqueous solution. The aqueous solution with the potassium permanganate added thereto was kept stirred for 1 hour, then the manganese oxide formed and precipitated in the aqueous solution was collected on a glass filter paper (Advantech's GS-25) using a reduced pressure filter. The collected manganese oxide was dried in a forced countercurrent-type drier at 120° C. for 12 hours. FIG. 27 shows an X-ray diffraction pattern of the manganese oxide aggregate powder obtained after the drying treatment. The X-ray diffraction pattern of FIG. 27 obviously differs from the X-ray diffraction pattern of R-type manganese dioxide, and does not completely the same as the pattern of the other alpha-type or beta-type manganese dioxide. Accordingly, it may be considered that the product may have a mixed phase of manganese oxide of some different crystal structures. From this, it is understood that, from the +2-valent manganese ion-containing aqueous solution, obtained was manganese oxide having a different crystal structure from that of R-type manganese dioxide.

Example 14

Method 3 for Recycling Waste Liquid

To 1 liter of the waste liquid generated in the acid treatment in Example 1, added was sodium carbonate $Na_2CO_3$ (by Wako Pure Chemical Industries) in such that the sodium carbonate $Na_2CO_3$ added could contain the carbonate $CO_3$ corresponding to the number of about 2 times the number of the +2-valent manganese ions existing in the aqueous solution, and kept stirred for 1 hour with a magnetic stirrer, thereby giving a precipitate of manganese carbonate $MnCO_3$. The reaction is referred to as carbonation reaction, and this is well used in producing general carbonates such as typically manganese carbonate and nickel carbonate. In this Example, it has been confirmed that, even in the aqueous solution generated in acid treatment of burned manganese carbonate with a dilute acid such as dilute hydrochloric acid or dilute sulfuric acid having a concentration of 0.5 mol/L, the method for producing a general carbonate is effective for synthesizing manganese carbonate.

Example 15

Figure 28:
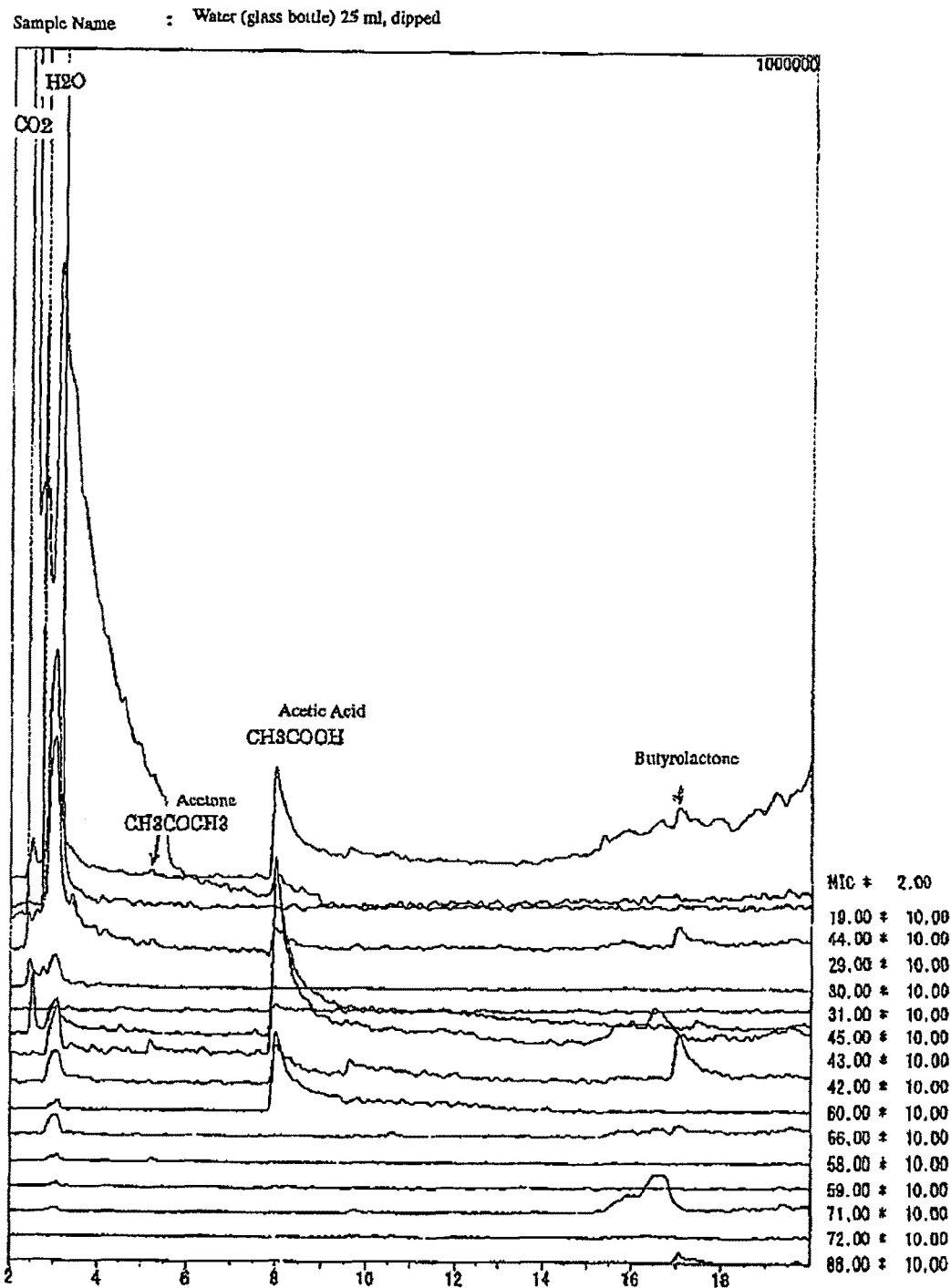
FIG. 28 is a mass spectrum of acetic acid in the aqueous dilute hydrochloric acid solution after the test in Example 15.
Figure 29:
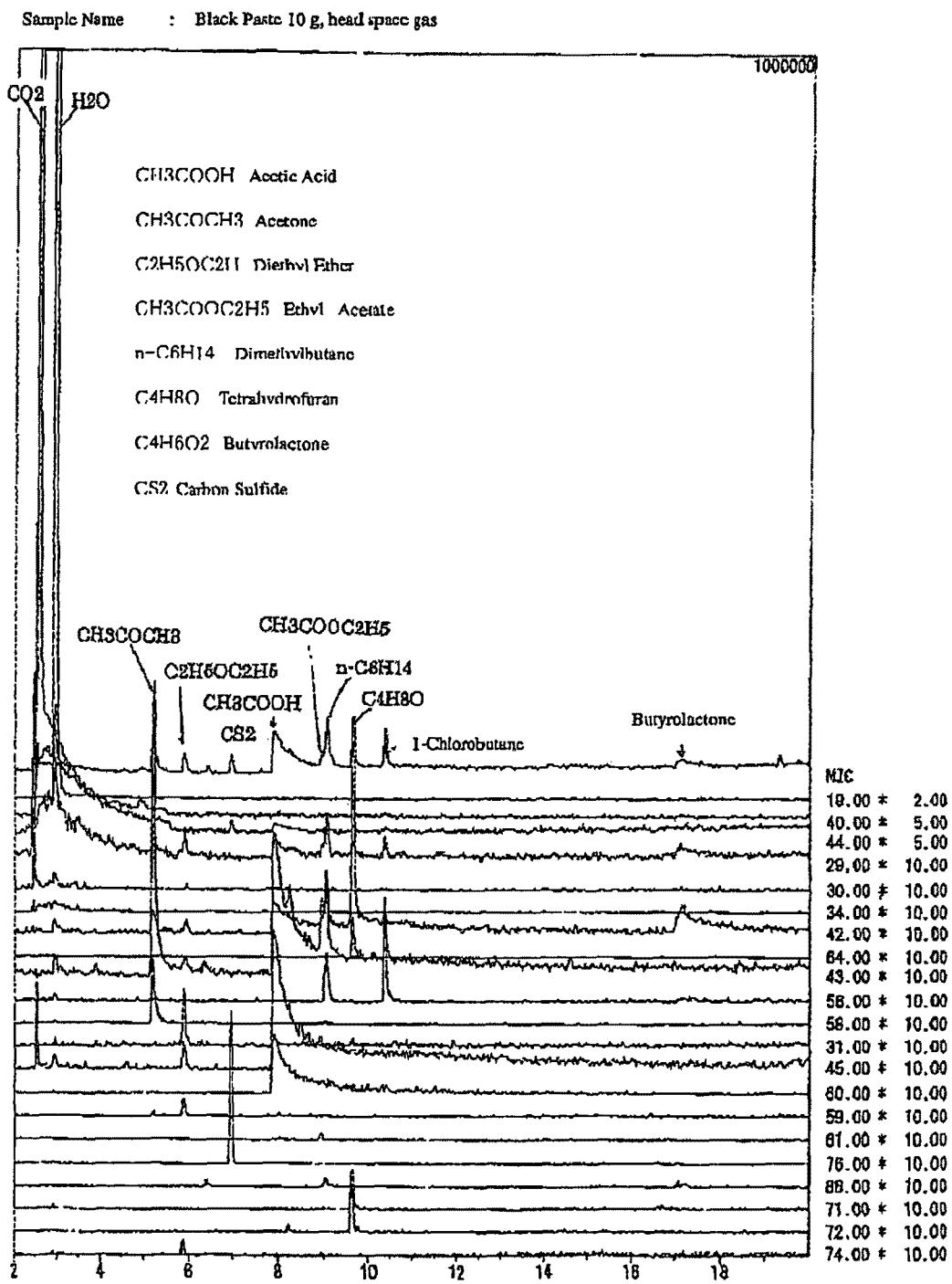
FIG. 29 is a mass spectrum of the gas generated from the paste of hydrogenated manganese dioxide aggregates after the test in Example 15.

Method for Synthesizing Acetic Acid with Catalyst Material Comprising Aggregates of Hydrogenated Manganese Dioxide Nanoparticles 25 g manganese carbonate special-grade reagent (by Wako Pure Chemical Industries) was put into a crucible, and burned therein at 200° C. for 6 hours, using an electric furnace. 60 g of thus-burnt manganese carbonate (burnt manganese carbonate) was suspended in 2 L of dilute hydrochloric acid having a concentration of 0.5 mol/L, and acid-treated therein for 1 hour. During this acid treatment, the nanoparticles of mainly hydrogenated manganese dioxide generated in the aqueous dilute hydrochloric acid were efficiently contacted with carbon dioxide gas jetted out from burnt manganese dioxide, thereby synthesizing acetic acid $CH_3COOH$. In this case, with the progress of the acid treatment, an odor of acetic acid was generated, and the existence of acetic acid in the dilute hydrochloric acid that had been separated after the acid treatment through solid-liquid separation was confirmed by the use of a mass spectrometric device equipped with a gas chromatograph directly bonded thereto (GCMS method). In the analytic process, 25 mL of the dilute hydrochloric acid after the acid treatment was sampled, put in a closed vial container, left as such at room temperature, and then the sample was dipped in a micro-collector tube (Stable Flex Carboxen/polydimethylsiloxane; CAR/PDMS) and the organic ingredient was trapped therein. Thus having trapped therein, the collector tube was inserted into the inlet port of a mass spectrometric device equipped with a gas chromatograph directly bonded thereto (Shimadzu's gas-chromatographic mass spectrometer GCMS-QP5050A) heated at 250° C., then left as such for 3 minutes, whereby the trapped vapor ingredient was repelled away and analyzed. FIG. 28 shows the found data indicating the detection of acetic acid $CH_3COOH$ and butyrolactone $CH_6O_2$ in the dilute hydrochloric acid separated by solid-liquid separation. In the paste of hydrogenated manganese dioxide aggregates that had been separated form the dilute hydrochloric acid after the acid treatment, detected were minor side products, acetone $CH_3COCH_3$, diethyl ether $C_2H_5OC_2H_5$, ethyl acetate $CH_3COOC_2H_5$, dimethylbutane n-$C_6H_{14}$, tetrahydrofuran $C_4H_8O$, carbon sulfide $CS_2$ and other ingredients, in addition to the main product, acetic acid, as in FIG. 29. Regarding the source thereof, these side products may be generated as intermediate products in the process of finally producing acetic acid in the dilute hydrochloric acid during the acid treatment. However, regarding carbon sulfide $CS_2$, the source of the sulfur S is unclear.

Example 16

Method for Synthesizing Acetic Acid and Acetaldehyde by the Use of Aggregates of Hydrogenated R-Type Manganese Dioxide Nanoneedles (Catalyst Material B in Example 2)

Figure 30:
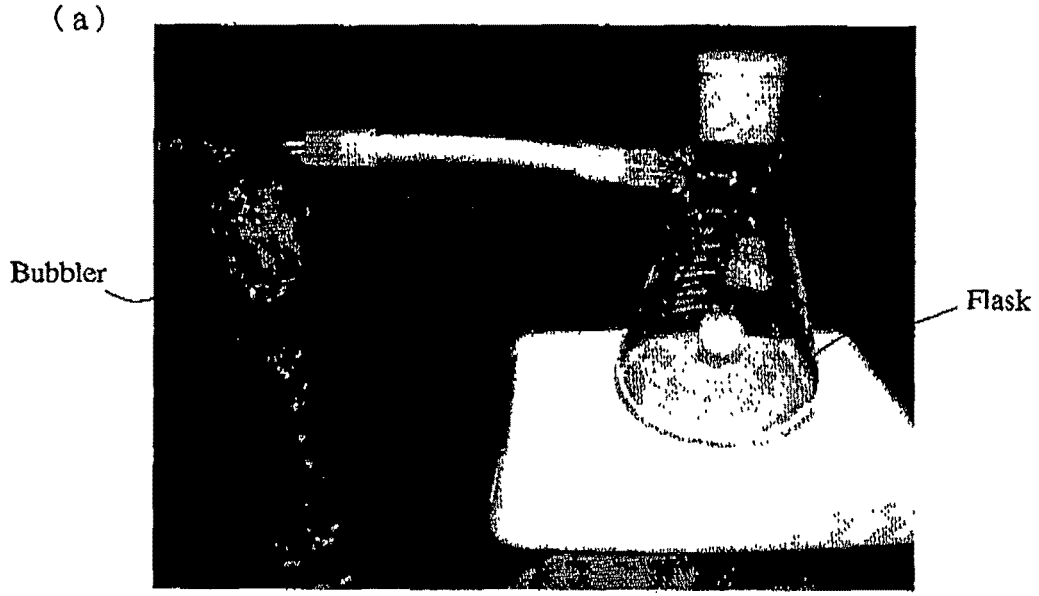
FIG. 30 is a photographic picture showing the reaction container in Example 16.
Figure 30:
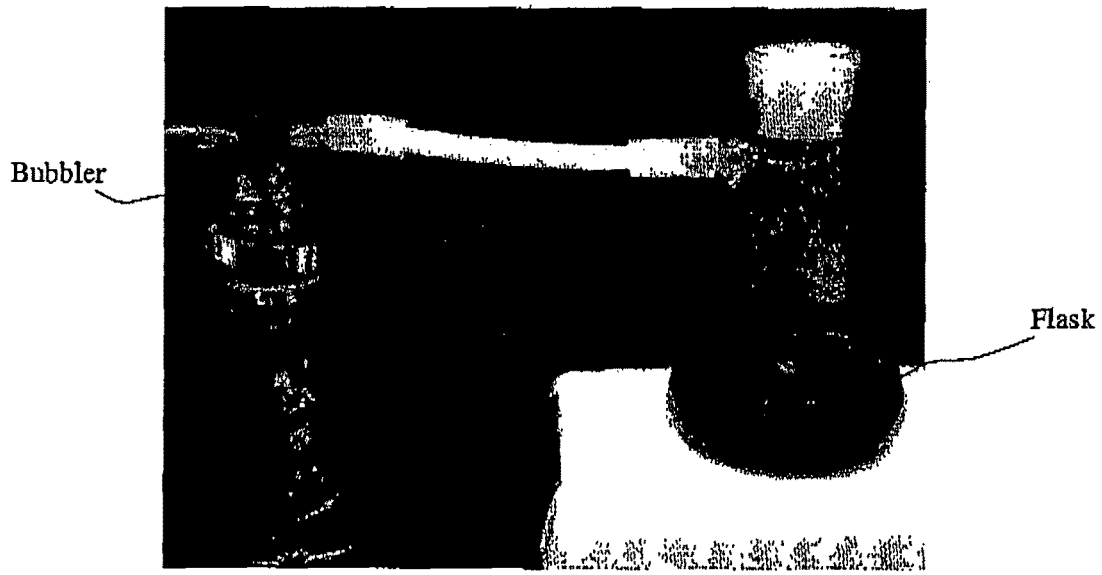

A Kinoshita glass ball filter 503G No. 4 was inserted into a glass made-flask set on a magnetic stirrer shown in FIG. 30(a), and a reactor, unit was prepared for introducing carbon dioxide gas (concentration 97%) from a cylinder to the flask via the glass ball filter. In the reactor, the catalyst material B obtained in Example 2, as suspended in 100 mL of aqueous dilute hydrochloric acid (0.5 mol/L), was sealed up in the container, and the suspension was stirred with a Teflon®-made magnetic stirrer set in the reactor. In this condition, carbon dioxide gas was bubbled into the dilute hydrochloric acid in the reactor via the glass ball filter, under a pressure of 6.4 MPa as read on the scale of the pressure controller attached to the cylinder (see FIG. 30(b)). The carbon dioxide gas overflowed from the reactor was discharged out via a bubbler filled with 50 mL of ion-exchanged water, as shown on the left side of the photographic pictures of FIG. 30(a) and (b). After 20 hours from the start of the carbon dioxide gas introduction, the carbon dioxide gas introduction was stopped, and then the system was kept static to precipitate the catalyst material B, and thereafter the dilute hydrochloric acid supernatant in the flask was sampled. 25 mL of the thus-sampled dilute hydrochloric acid was put in a closed vial container and left at room temperature, and then a micro-collector tube (Stable Flex Carboxen/polydimethylsiloxane; CAR/PDMS) was dipped in the sample to trap the organic ingredient. Thus having trapped therein, the collector tube was inserted into the inlet port of a mass spectrometric device equipped with a gas chromatograph directly bonded thereto (Shimadzu's gas-chromatographic mass spectrometer GCMS-QP5050A) heated at 250° C., then left as such for 3 minutes, whereby the trapped vapor ingredient was repelled away and analyzed.

Figure 31:
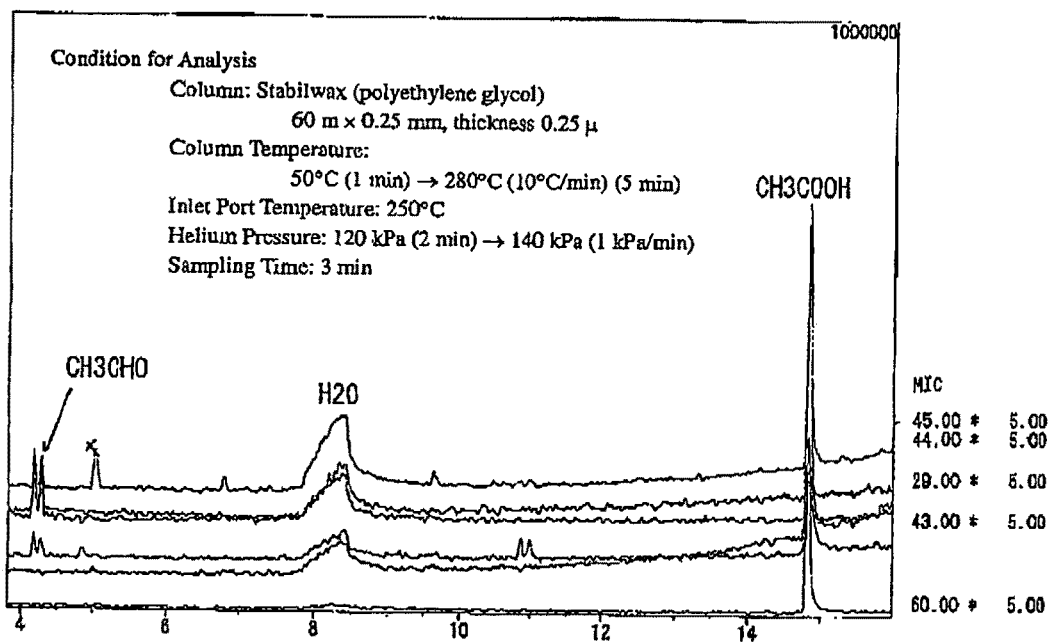
FIG. 31 is a mass spectrum of acetic acid and acetaldehyde in the aqueous dilute hydrochloric acid solution after the test in Example 16.

FIG. 31 shows the found data of the analysis. FIG. 31 has a peak peculiar to acetic acid $CH_3COOH$ and a peak peculiar to acetaldehyde $CH_3CHO$, therefore confirming the presence of acetic acid and a small amount of acetaldehyde in the sample.

INDUSTRIAL APPLICABILITY

According to the invention mentioned above, an aqueous acid solution such as dilute hydrochloric acid or the like can be oxidatively decomposed through the catalytic reaction with manganese under energy of visible light having a wavelength of from 400 to 500 nm, thereby producing oxygen gas, proton and electron; and therefore, oxygen gas and electricity can be produced inexpensively at high efficiency. This is caused by the catalyst material of the invention that brings about artificial high-efficient oxygen-producing reaction through photosynthesis with plant. The high efficiency of oxygen production that the material of the invention exhibits may be considered as follows: A plant chloroplast is composed of macroprotein molecules having a crystal lattice of up to 8500 $nm^3$, in which one protein molecule has only 4 manganese atoms having a catalytic effect; while one manganese oxide nanoparticle (for example, having a diameter of 2 nm and a length of 5 nm) of the invention contains at least 1000 manganese atoms having catalyst activity, and the nanoparticles further gather to form a mesoporous structure, and therefore, having such a broad contact area, the porous material can oxidatively decompose water and its catalyst efficiency in oxygen production is significantly increased more than that of plant. Further in the invention, when carbon dioxide gas is contacted with an aqueous suspension of a porous powder of add-treated manganese oxide by bubbling therein, then the carbon dioxide gas can be directly converted into acetic acid as the main product, or that is, the carbon dioxide gas can be decomposed and converted into water and the main product and, as other minor side products, organic substances of butyrolactone, acetone, diethyl ether, ethyl acetate, tetrahydrofuran, formaldehyde, formalin and others.

Further in the invention, aggregates of hydrogenated manganese dioxide nanoparticles are contacted with carbon dioxide gas and then dried, and it has become possible to produce a saccharide which is one substance to be energy for activity of animals such as typically humans and plants and is known as only one energy source for brain.

In the invention, the waste liquid generated in production of the catalyst material mentioned above can be recycled. Since the waste liquid contains manganese ion at high concentration, it could not be drained off directly as such in public waterways. Accordingly, it is necessary to remove the manganese ion from the waste liquid and to purify it, before it is drained off; however, in the invention, the waste liquid can be effectively reused for production of R-type manganese dioxide, manganese dioxide, and manganese carbonate from it, and the invention realizes an inexpensive method for waste treatment.

Further in the invention, according to a method of adding an oxidizing agent and an alkali to a divalent manganese ion-containing aqueous solution, R-type manganese dioxide useful as a catalyst material can be produced inexpensively.

The invention claimed is:

1. A catalyst material for producing oxygen gas, proton and electron by oxidatively decomposing water, which comprises aggregates of nanoneedles of mainly R-type manganese dioxide and has a mesoporous structure.

2. The catalyst material as claimed in claim 1, wherein the mesoporous structure has a mean pore diameter falling within a range of from 3 nm to 30 nm, a BET specific surface area of from 40 to 200 $m^2/g$, and a total pore volume falling within a range of from 0.1 to 0.5 $cm^3/g$.

3. The catalyst material as claimed in claim 1 or 2, wherein the manganese dioxide nanoneedles have a diameter falling within a range of from 1 nm to 50 nm and a length falling within a range of from 3 nm to 500 nm.

4. The catalyst material as claimed in claim 1 or 2, wherein the manganese dioxide aggregates have a diameter falling within a range of from 1 to 100 μm.

5. A catalyst material for producing acetic acid or an organic substance from carbon dioxide gas, which comprises aggregates of nanoparticles of mainly hydrogenated manganese dioxide having an R-type crystal structure and an epsilon-type crystal structure.

6. The catalyst material as claimed in claim 5, wherein the aggregates of nanoparticles of hydrogenated manganese dioxide are aggregates of nanoneedles of hydrogenated manganese dioxide and have a mesoporous structure.

7. The catalyst material as claimed in claim 6, wherein the mesoporous structure has a mean pore diameter falling within a range of from 3 nm to 30 nm, a BET specific surface area of from 40 to 200 $m^2/g$, and a total pore volume falling within a range of from 0.1 to 0.5 $cm^3/g$.

8. The catalyst material as claimed in claim 6 or 7, wherein the hydrogenated manganese dioxide nanoneedles have a diameter falling within a range of from 1 nm to 50 nm and a length falling within a range of from 3 nm to 500 nm.

9. The catalyst material as claimed in claim 6 or 7, wherein the aggregates of hydrogenated manganese dioxide nanoneedles have a diameter falling within a range of from 1 to 100 μm.

10. A method for producing a catalyst material for producing oxygen gas, proton and electron by oxidatively decomposing water, which comprises burning a divalent manganese compound, followed by acid-treating and thereafter drying the compound,
wherein the divalent manganese compound is manganese carbonate.

11. The method for producing a catalyst material as claimed in claim 10, wherein the compound is, after dried, further washed with water or with hot water.

12. A method for producing a catalyst material for producing acetic acid or an organic substance from carbon dioxide gas, which comprises burning a divalent manganese compound, and then acid-treating the compound,
wherein the divalent manganese compound is manganese carbonate.

13. The method for producing a catalyst material as claimed in claim 12, wherein the divalent manganese compound is, after burned and acid-treated, further washed with water.

14. The method for producing a catalyst material as claimed in claim 12, wherein the divalent manganese compound is, after burned and acid-treated, further dried and the acid-treated.

15. The method for producing a catalyst material as claimed in claim 14, wherein the compound is, after dried and before acid-treated, washed with water or with hot water.

16. A method for producing oxygen gas from water by using a catalyst material of claim 1 or 2, wherein the catalyst material is contacted with an aqueous acid solution under visible light to produce oxygen gas.

17. A method for synthesizing acetic acid or an organic substance by decomposing carbon dioxide gas by the use of a catalyst material of any of claims 5 to 7, wherein carbon dioxide gas is contacted with the catalyst material in the presence of an aqueous acid solution.

18. A method for generating electric energy by using a catalyst material of claim 1 or 2, wherein the catalyst material is contacted with an aqueous acid solution under visible light.

19. A hydrogen gas sensor comprising a catalyst material of claim 1 or 2, a pair of electrodes connected to each other via the catalyst material, and a voltage detecting unit for detecting the potential difference between the electrodes, wherein hydrogen gas introduced to the side of one electrode connected with the electrode material is contacted with the electrode in the presence of water, the hydrogen ion thus generated dissolves in water to be an aqueous acid solution, the acid solution is contacted with the catalyst and decomposed to generate electric energy, and the resulting potential difference between the electrodes is detected with the voltage detecting unit to thereby detect the hydrogen gas.

20. A method for synthesizing acetic acid, comprising the steps of:
Burning a manganese carbonate and acid-treating it with an acid-treating liquid to obtain carbon dioxide gas and a paste of aggregates of nanoparticles of mainly hydrogenated manganese dioxide having an R-type crystal structure and an epsilon-type crystal structure, and
contacting the paste of aggregates of nanoparticles with the carbon dioxide gas to obtain acetic acid.

21. A method for synthesizing a saccharide, comprising the steps of:
burning a manganese carbonate and acid-treating it with an acid-treating liquid to obtain a paste of aggregates of nanoparticles of mainly hydrogenated manganese dioxide having an R-type crystal structure and an epsilon-type crystal structure, and
drying the paste of aggregates of nanoparticles in air, wherein a liquid containing saccharide is bled out from the paste of aggregates of nanoparticles.

22. A method for recycling an acid-treatment liquid (waste liquid), which comprises burning a divalent manganese compound, followed by acid-treating the compound to obtain the acid-treatment liquid, adding an oxidizing agent and an alkali compound to the acid-treatment liquid to thereby precipitate manganese oxide, then acid-treating, and drying the manganese oxide precipitate to obtain R-type manganese dioxide.

23. The method for recycling an acid-treatment liquid according to claim 22, wherein the divalent manganese compound is manganese carbonate.

24. A method for recycling an acid-treatment liquid (waste liquid), which comprises burning a divalent manganese compound, followed by acid-treating the compound to obtain the acid-treatment liquid, and adding potassium permanganate to the acid-treatment liquid to obtain manganese dioxide.

25. The method for recycling an acid-treatment liquid according to claim 24, wherein the divalent manganese compound is manganese carbonate.

26. A method for recycling an acid-treatment liquid (waste liquid), which comprises burning a divalent manganese compound, followed by acid-treating the compound to obtain the acid-treatment liquid, and adding an alkali metal or alkaline earth metal carbonate to the acid-treatment liquid to obtain manganese carbonate.

27. The method for recycling an acid-treatment liquid according to claim 26, wherein the divalent manganese compound is manganese carbonate.

\* \* \* \* \*